United States Patent [19]

Rouse et al.

[11] Patent Number: 4,804,938
[45] Date of Patent: Feb. 14, 1989

[54] DISTRIBUTION ENERGY MANAGEMENT SYSTEM

[75] Inventors: Donald W. Rouse, Lilburn, Ga.; Lawrence B. Horwitz, Danville, Calif.; E. Thomas Wiggins, Chesterfield, Mo.

[73] Assignee: Sangamo Weston, Inc., Norcross, Ga.

[21] Appl. No.: 922,911

[22] Filed: Oct. 24, 1986

[51] Int. Cl.[4] .......................................... H04M 11/04
[52] U.S. Cl. .......................... 340/310 A; 340/310 R; 340/825.06; 375/1; 375/37; 455/3
[58] Field of Search ........ 340/310 A, 310 R, 310 CP, 340/825.06, 825.54, 825.07–825.13, 825.74; 375/1, 115, 8, 37; 455/3; 370/18

[56] References Cited

U.S. PATENT DOCUMENTS

| | | |
|---|---|---|
| 3,350,644 | 10/1967 | McNair . |
| 3,701,894 | 10/1972 | Lowe et al. . |
| 3,706,933 | 12/1972 | Bidell et al. . |
| 3,947,634 | 3/1976 | Betts . |
| 4,048,563 | 9/1977 | Osborne . |
| 4,164,628 | 8/1979 | Ward et al. . |
| 4,178,549 | 12/1979 | Ledenbach et al. . |
| 4,203,071 | 5/1980 | Bowles et al. .......................... 375/1 |
| 4,204,194 | 5/1980 | Bogacki .......................... 340/310 A |
| 4,241,312 | 12/1980 | Barnes .......................... 375/1 |
| 4,241,447 | 12/1980 | Epstein .......................... 375/1 |
| 4,247,939 | 1/1981 | Stromswold et al. .......................... 375/1 |
| 4,281,409 | 7/1981 | Schneider .......................... 370/18 |
| 4,286,333 | 8/1981 | Franklin .......................... 375/1 |
| 4,301,537 | 11/1981 | Roos .......................... 375/1 |
| 4,361,891 | 11/1982 | Lobenstein et al. .......................... 375/1 |
| 4,379,284 | 4/1983 | Boxkin .......................... 340/310 R |
| 4,392,220 | 7/1983 | Hirosaki et al. .......................... 370/18 |
| 4,400,790 | 8/1983 | Chambers et al. .......................... 375/1 |
| 4,423,517 | 12/1983 | Danno et al. .......................... 375/1 |
| 4,438,519 | 3/1984 | Bose .......................... 375/1 |
| 4,460,992 | 7/1984 | Gutleber .......................... 370/19 |
| 4,475,215 | 10/1984 | Gutleber .......................... 375/34 |
| 4,493,080 | 1/1985 | Campbell .......................... 375/116 |
| 4,601,047 | 7/1986 | Horwitz et al. .......................... 375/1 |
| 4,641,322 | 2/1987 | Hasegawa .......................... 340/310 A |
| 4,845,478 | 11/1984 | Nossen .......................... 375/1 |

OTHER PUBLICATIONS

"Pseudonoise Signalling For Power Line Carrier Applications"; IEEE, pp. 1–6; 8–1985.

Primary Examiner—Donnie L. Crosland
Attorney, Agent, or Firm—Sanford J. Asman

[57] ABSTRACT

A bidirectional data communications distribution network is established between the system operations center (SOC) and customer terminals of a load management and electrical energy distribution system. The distribution network comprises independent processor controlled, primary communications interface units (PCI) in communication with the SOC over telephone lines or other medium. Each PCI is in turn in communication with a plurality of independent processor controlled, secondary communications interface units (SCI) over electrical utility primary distribution power lines. Signals between PCIs and SCIs on the primary distribution power lines are code division multiplexed using direct sequence spread spectrum (DSSS) signal processing. Each SCI continuously polls a number of assigned customer load terminals on the low voltage side of the electrical energy distribution system, storing and calculating meter register readings and load status.

10 Claims, 23 Drawing Sheets

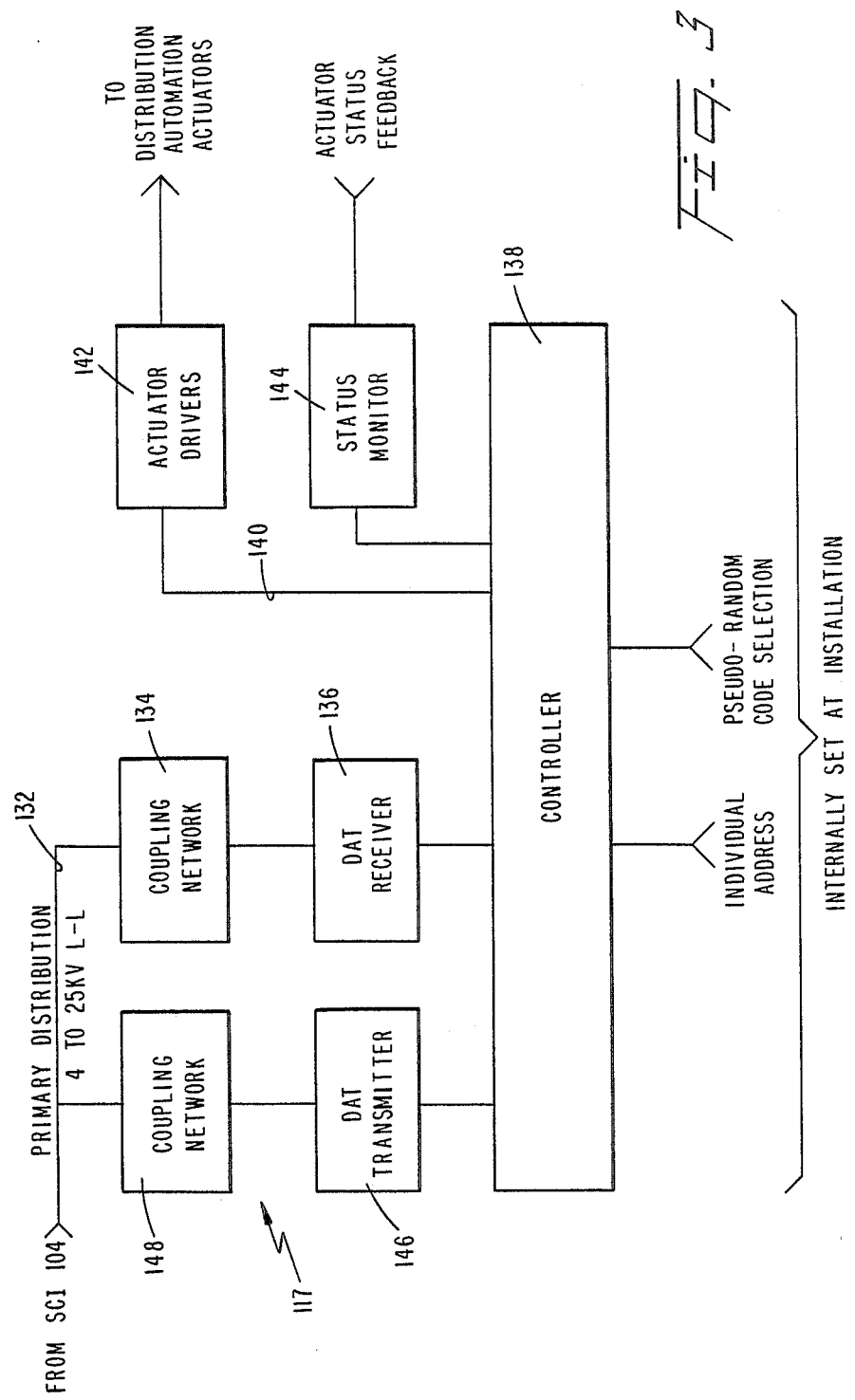

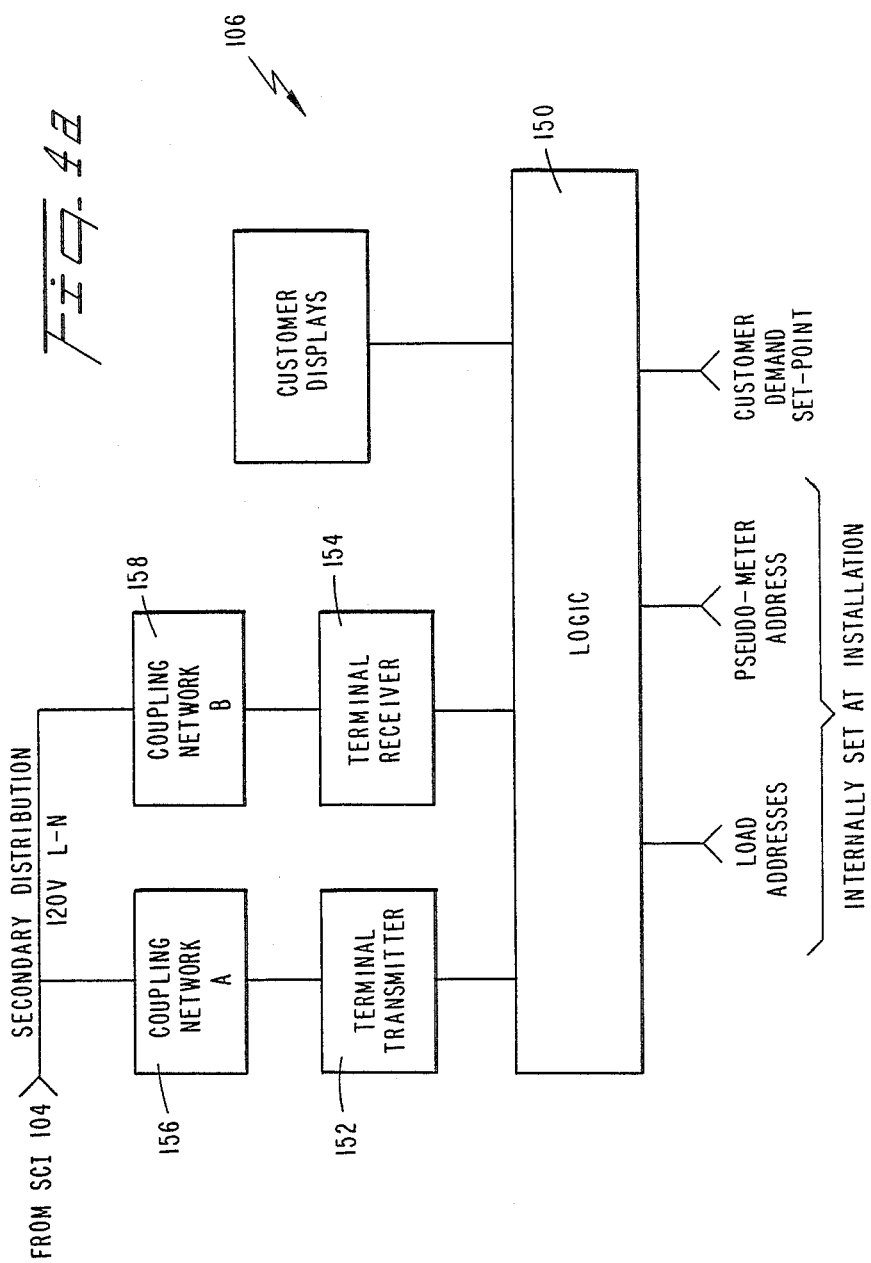

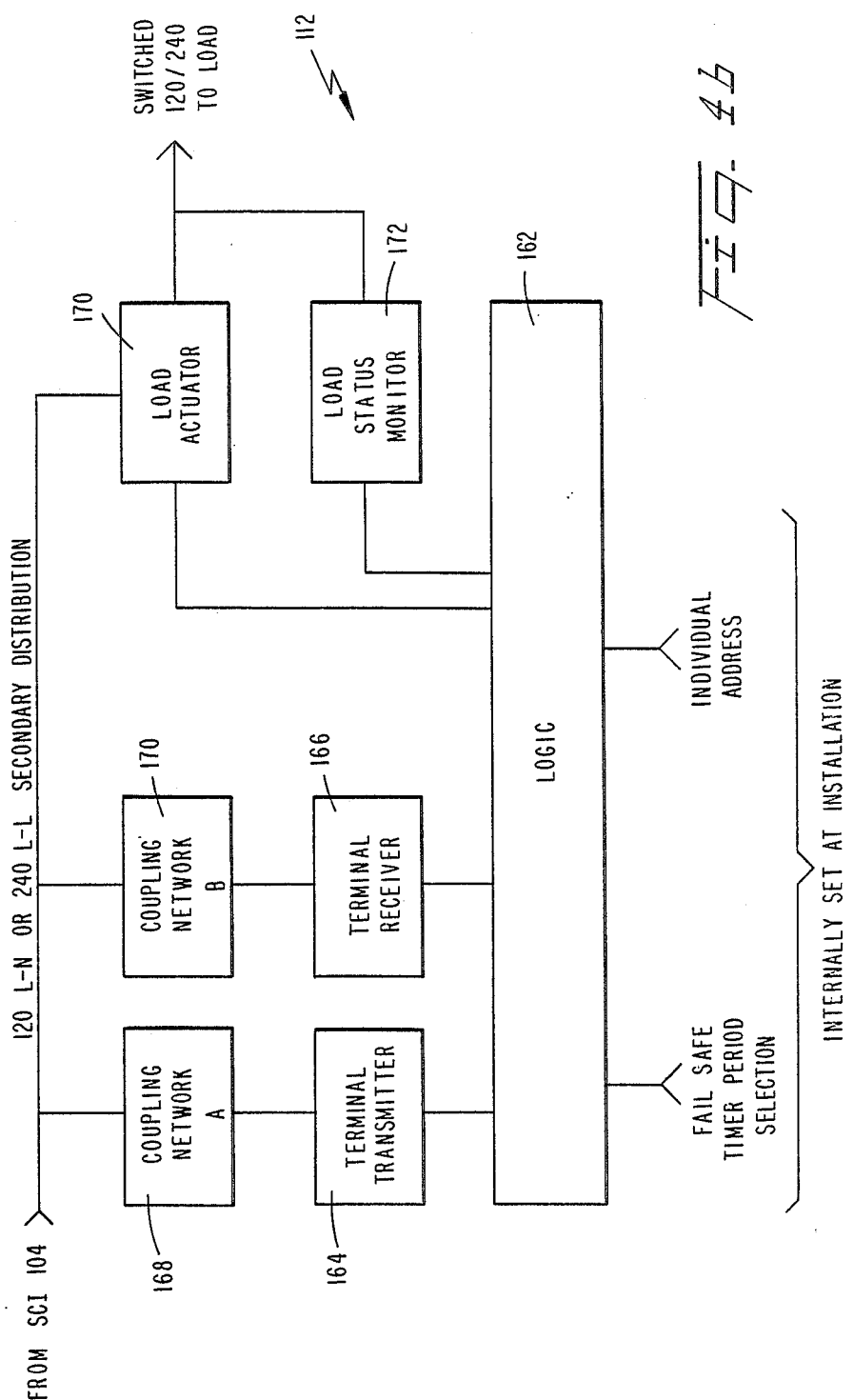

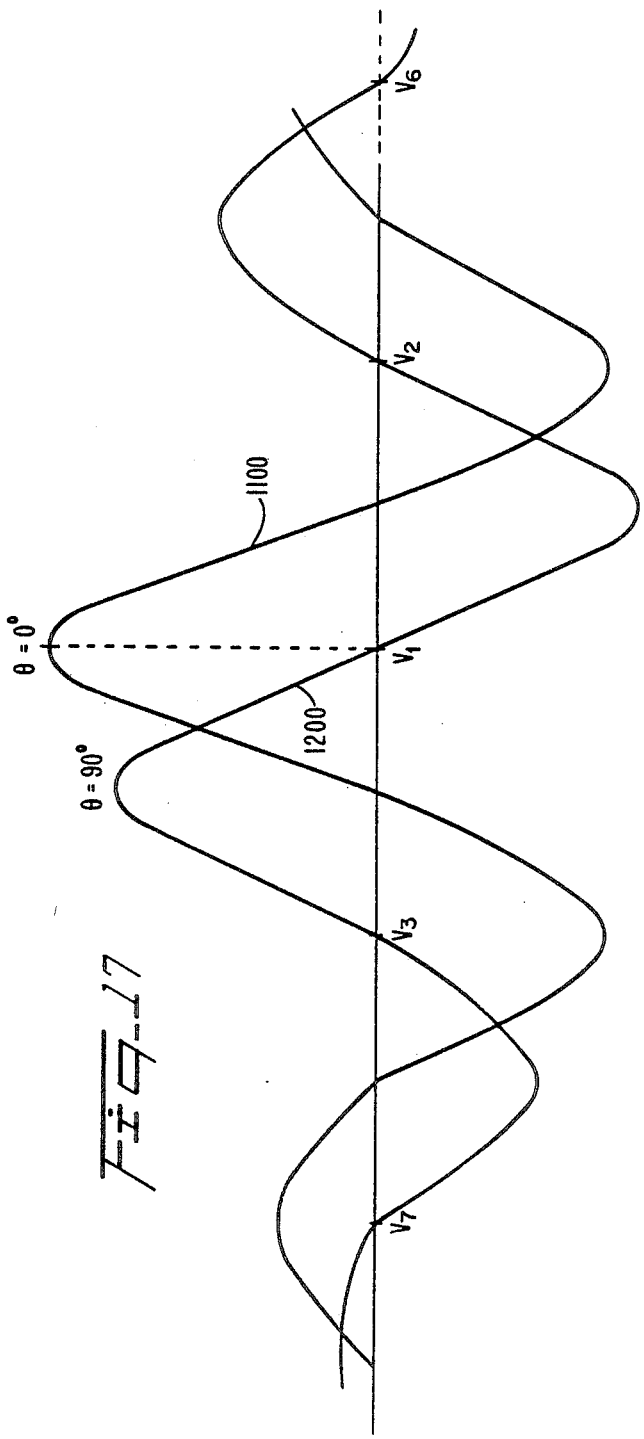

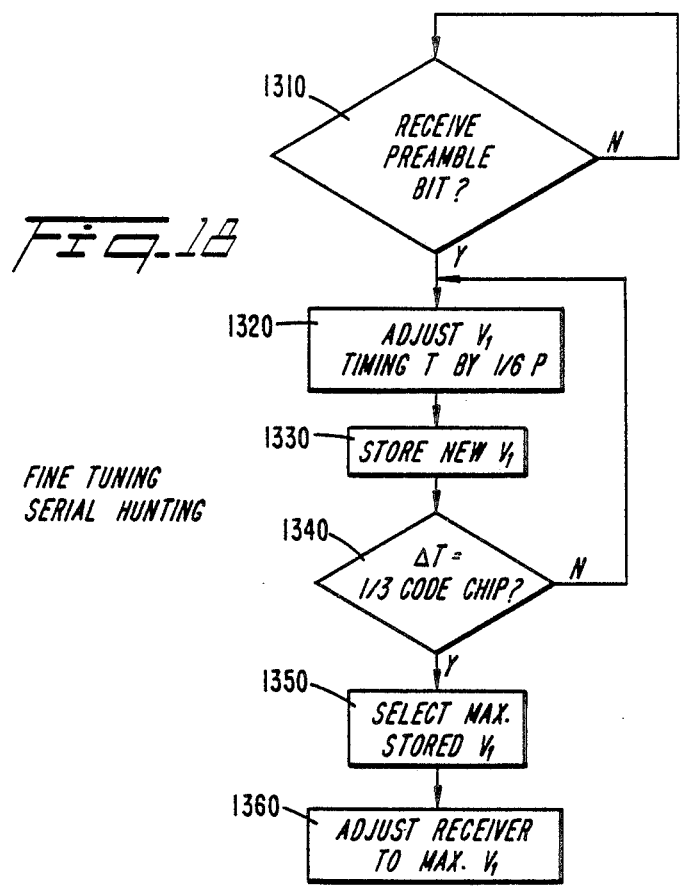
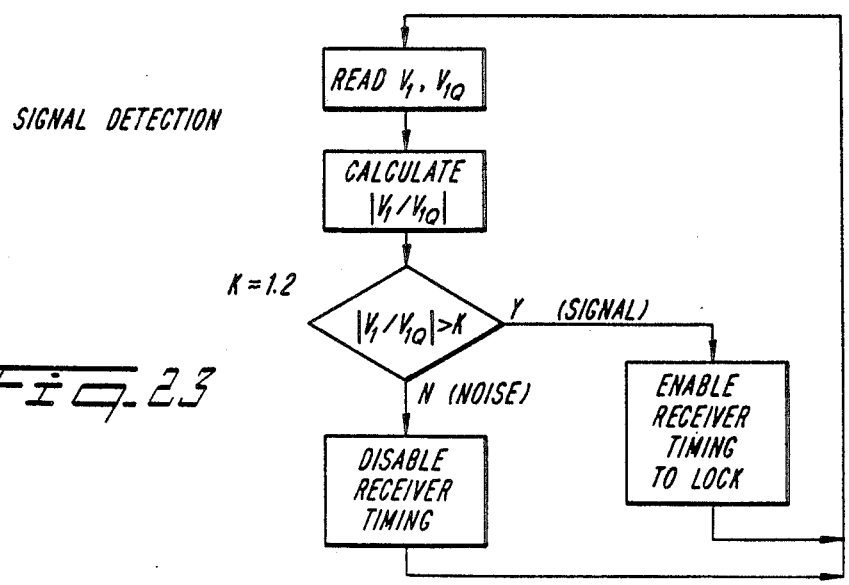

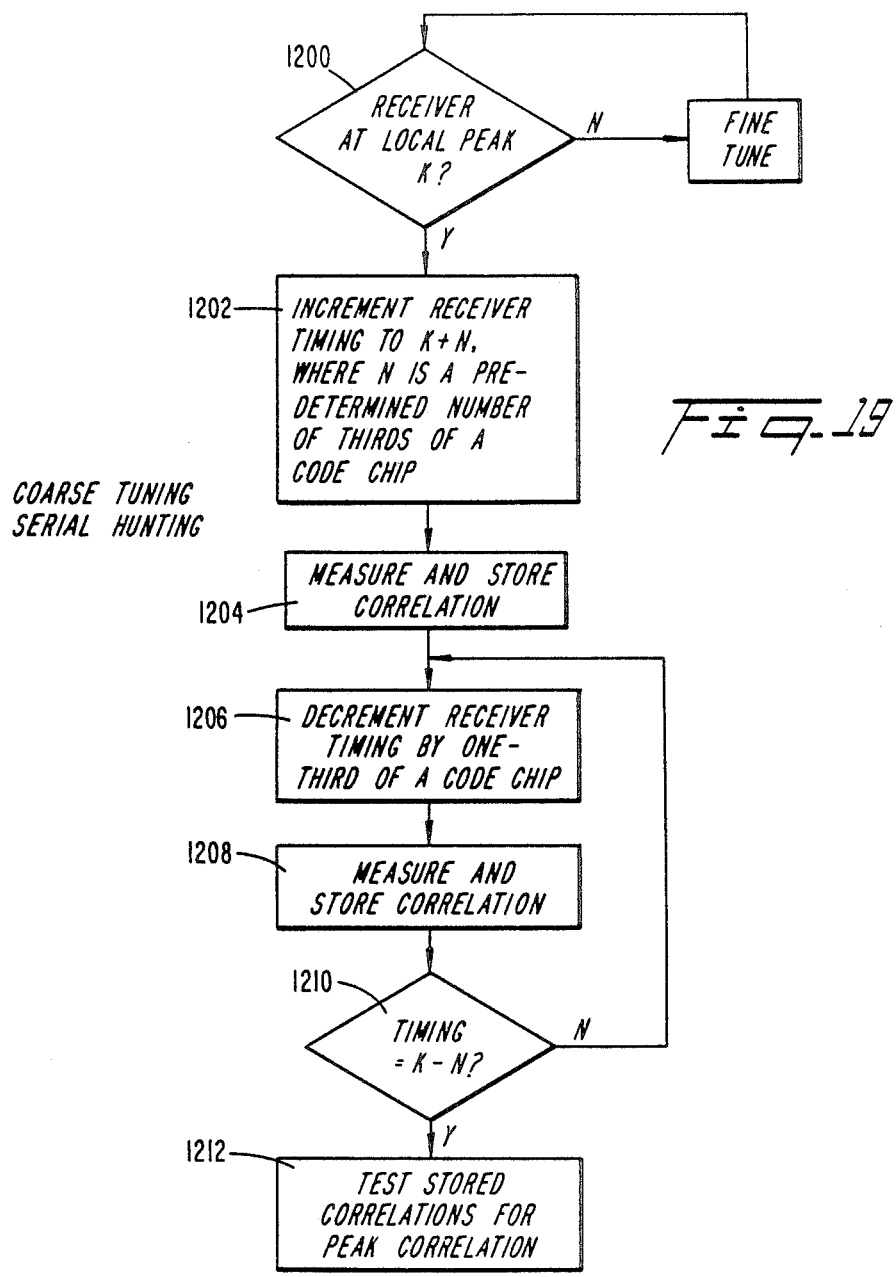

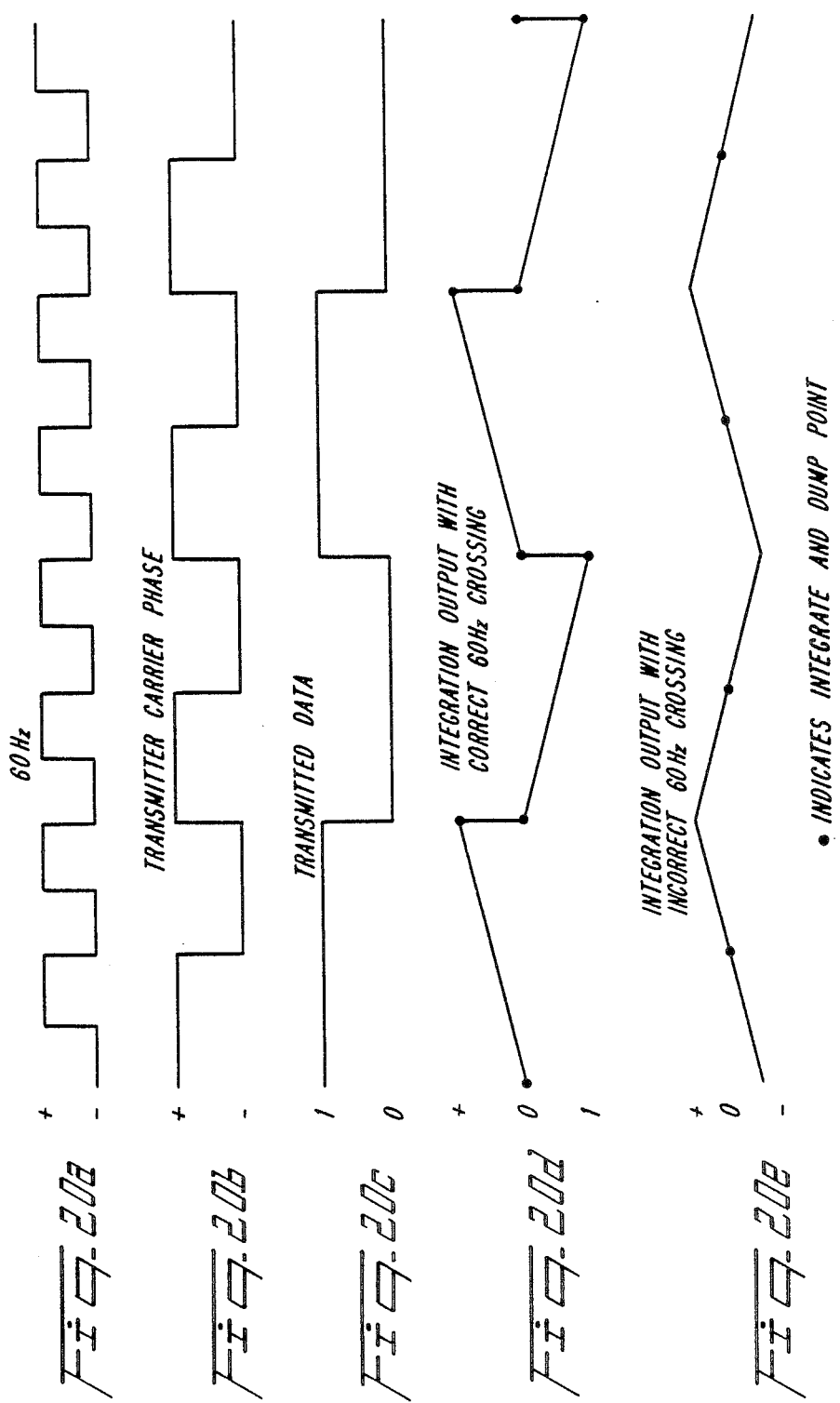

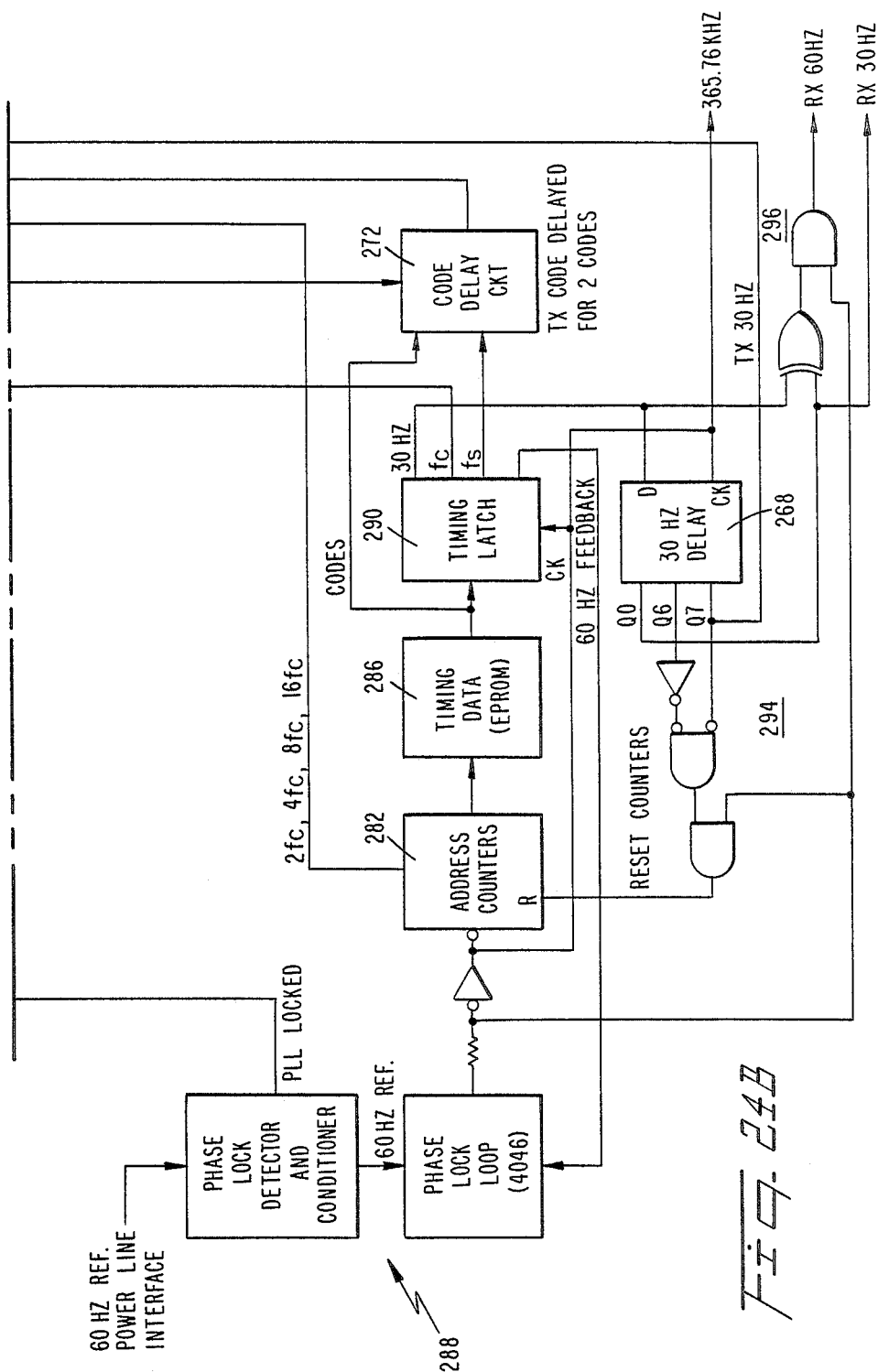

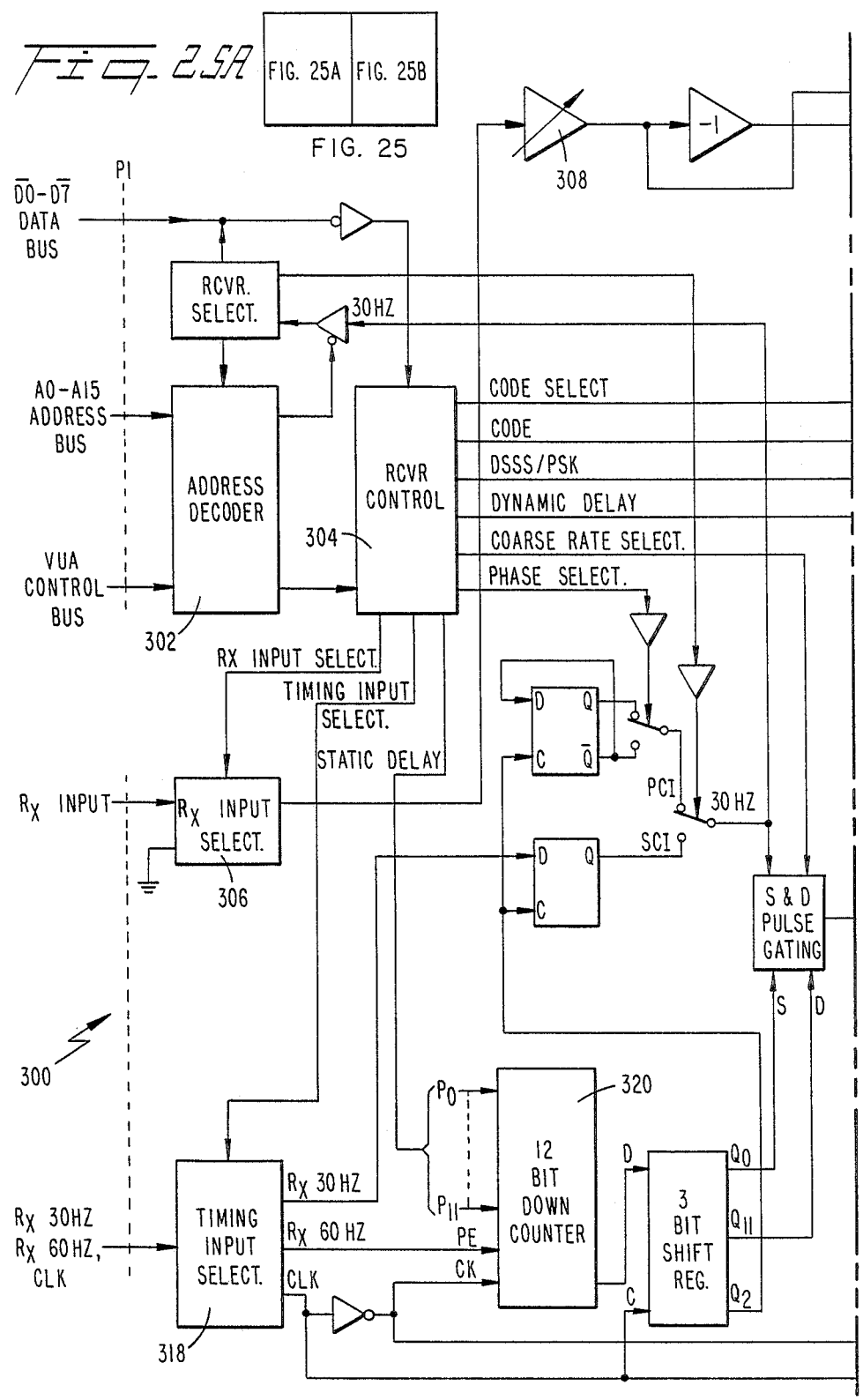

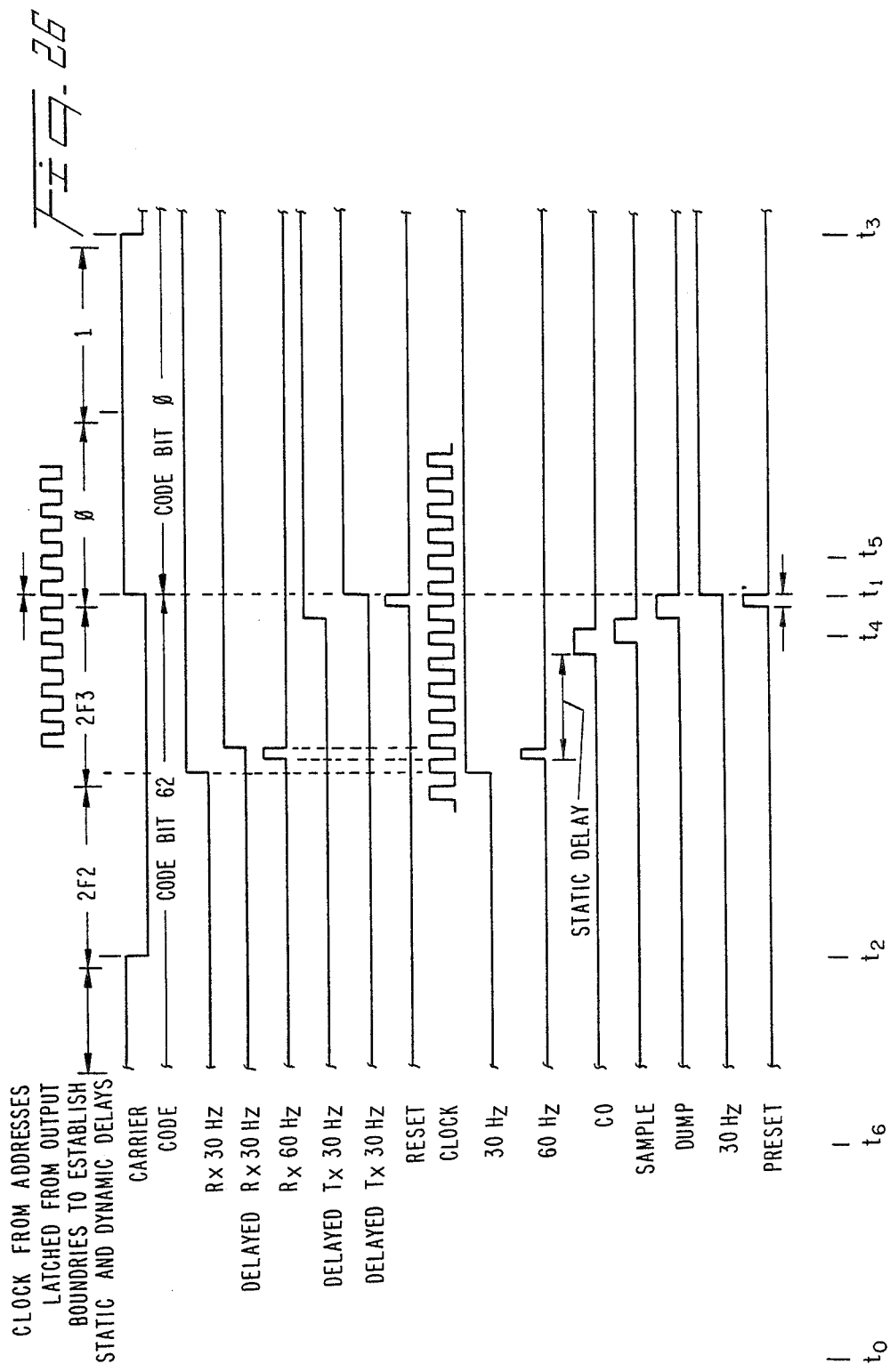

DISTRIBUTION ENERGY MANAGEMENT SYSTEM

CROSS REFERENCES TO RELATED APPLICATIONS

This application is related to the following copending applications assigned to the assignee of this application: application Ser. No. 592,670, filed on Mar. 23, 1984 (Now U.S. Pat. No. 4,561,089, issued Dec. 24, 1985), and entitled Correlation Detectors for Use in Direct Sequence Spread Spectrum Signal Receiver; application Ser. No. 592,674, filed on Mar. 23, 1984, and entitled System for Improving Signal-to-Noise Ratio in a Direct Sequence Spread Spectrum Signal Receiver; application Ser. No. 592,667, filed on Mar. 23, 1984 (now U.S. Pat. No. 4,567,588, issued Jan. 28, 1986), and entitled Synchronization System for Use in Direct Sequence Spread Spectrum Signal Receiver; application Ser. No. 592,668, filed on Mar. 23, 1984, and entitled Timing Signal Correlation System for Use in Direct Sequence Spread Spectrum Signal Receiver; and application Ser. No. 592,669 filed on Mar. 24, 1984 (now U.S. Pat. No. 4,601,047, issued July 15, 1986), and entitled Code Division Multiplexer Using Direct Sequence Spread Spectrum Signal Processing.

TECHNICAL FIELD

The present invention relates generally to methods of and apparatus for providing bidirectional communications between the system operations center (SOC) and customer loads of a utility power distribution system, and more particularly, toward a logical hierachical method and system that provides bidirectional communications over the primary distribution power lines of an electric utility, wherein signals transmitted over the electrical power lines of the utility are code division multiplexed using direct sequence spread spectrum (DSSS) signal processing.

BACKGROUND ART

The U.S. electric utility industry has recently experienced dramatic changes in the fundamental factors which govern costs associated with increasing electric power requirements. As a result, capital costs of system expansion and associated expenses have resulted in increased power costs to the customer. Furthermore, because power generating plants must have sufficient capacity to meet peak consumer demands, the size of the utility and associated costs are substantially larger than are needed to supply average consumer demand.

To help encourage customers to shape their times of maximum consumption toward off-peak hours, and to more equitably distribute the cost of producing electricity among users, many consumers are charged at least in part in accordance with peak power demand in addition to average or actual power consumed. To minimize energy costs, consumers practice voluntary load shedding, whereby non-vital loads are disconnected from the power lines during peak power demand periods. Further, within a program of involuntary load shedding, some utilities monitor consumption, distinguish between vital and non-vital consumer loads, and selectively disconnect or "shed" non-vital loads from the power lines.

One type of load management technique, known as ripple tone injection, involves unidirectionally impressing encoded audiofrequency pulses directly onto the utility power lines, to be decoded at receivers located at the consumer sites, to carry out desired commands. This type of system is, however, impractical for establishing bidirectional communications of data on the utility power lines because the cost of installing transmitters at the consumer sites is too high. Other techniques for controlling load shape involve transmitting pulse code modulated data to receivers at the consumer sites, each preset to respond to particular code signals to carry out commands. In Gurr, U.S. Pat. No. 4,264,960, for example, a hierarchical system involves a programmable microprocessor based central controller in bidirectional communication with a plurality of microprocessor controlled, substation injection units that inject pulse code signals onto the power lines. Remote receiver units at the customer sites respond to substation injection unit commands to control the on and off times of customer loads. Bogacki, U.S. Pat. No. 4,204,194 discloses an automatic meter reading and control system using the utility power lines, wherein data synchronized to 60 Hz. and in the form of 30 bit per second data pulse bursts at different frequencies are impressed onto the lines.

Problems which have tended to reduce the reliability of systems of the above types include the limited bandpass characteristic of utility power lines as well as electrical noise. For bidirectional communication between the consumer sites and the distribution substation, the distribution line including the distribution transformer can be characterized as a low pass filter with a band pass of approximately ten kilohertz. While commercial power line characteristics display frequency bands of increased signal strength at frequencies greater than ten kilohertz, the frequency of occurrence of these bands varies widely from feeder to feeder, is unpredictable, and as a result, is unacceptable for use as a communications link. In addition, ripple or pulse data systems, being narrow band based, tend to be susceptible to electrical noise distributed throughout the electrical spectrum on the power lines.

A primary object of this invention, therefore, is to provide a system for establishing bidirectional communications on utility power lines substantially independent of the bandpass characteristics of the lines.

Another object is to provide a system for providing bidirectional communications on utility power lines while keeping user costs to a minimum.

A further object is to maximize the number of communication channels established between a control center and geographically remote user sites of a utility power line communication system.

A still further object is to provide a bidirectional communications link between a systems operation center and consumer sites of a utility system with a logical hierarchy that enables data to be distributed substantially without geographical limitation.

A further object is to provide a bidirectional communication system within a utility having high tolerance to narrow band noise sources on the lines and power line attenuation as a function of frequency.

A further object is to provide within an electrical utility distribution network a bidirectional communication system which requires relatively low signal power densities, improves system economy and reduces interchannel interference.

An additional object is to provide a bidirectional communication system within an electric utility distribution system that maximizes the number of communication channels that can co-exist simultaneously on the power lines.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

DISCLOSURE OF THE INVENTION

The above and other objects are satisfied in a load management electrical energy distribution system, wherein a novel distribution network establishes bidirectional data communications between a system operations center (SOC) and a plurality of customer terminals. The distribution network comprises independent processor controlled, primary communications interface units (PCI) in communication with the SOC over the telephone lines or other bidirectional communications network. A plurality of independent processor controlled, secondary communications interface units (SCI) is in communication with each PCI over the electrical utility primary distribution power lines, and a group of customer terminals is in communication with each SCI over the lower voltage electrical power lines at the user sites.

The PCIs may be located at distribution substations of the utility, and each SCI is located at the low voltage side of a distribution transformer, in communication with the meters, loads and terminals served by that transformer.

Data between each PCI and its associated group of SCIs are spread to a broad bandwidth by spread spectrum signal processing. Each PCI and SCI contains at least one transmitter and receiver, all synchronized to 60 Hz. or other common frequency standard on the utility power lines. Signals transmitted from the PCI are code division multiplexed to be detected by only the receiver of a predetermined one or group of SCI receivers tuned to the PCI transmitter.

Each transmitter transmits a data modulated carrier spread by a bipolar pseudo-random code which is a different assigned shift of a common bipolar code sequence. To discriminate the signal transmitted by a predetermined transmitter from signals transmitted by the others, the receiver generates two local bipolar pseudo-random codes that are replicas of the transmitted common bipolar pseudo-random code. One of the locally generated codes has the same code sequence shift as the code sequence shift assigned to the predetermined transmitter; the other locally generated code has a code sequence shift that is not assigned to any of the transmitters. The two locally generated codes are processed to obtain a trinary code sequence which is cross-correlated with the incoming signal, to discriminate and extract information from the code transmitted by the predetermined transmitter.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

BRIEF DESCRIPTION OF THE DRAWINGS

FIG. 3 is a block diagram of the distribution automation terminal (DAT) within the DEM system of FIG. 1;

FIGS. 4a, 4b and 4c are block diagrams of a user terminal, load terminal and meter terminal, respectively, within the DEM system;

FIG. 17 is an in-phase and quadrature-phase correlation pattern, together with the location of subreceiver channels for correlation detection;

FIG. 18 is a flow chart showing a method of fine tuning the receiver in accordance with the invention;

FIG. 19 is a flow chart showing a technique for performing coarse tuning of the receiver;

FIGS. 20a–20e are timing diagrams showing the relationship of timing pulses between a transmitter and a receiver within the DEM system;

FIG. 23 is a flow chart showing a method of signal detection, in accordance with the invention, used within the DEM system;

FIGS. 24, 24a and 24b are a circuit diagram of a transmitter implementation, in accordance with the invention, used within the DEM system;

FIGS. 25, 25a and 25b are a circuit diagram of a receiver used within the DEM system;

FIG. 26 includes timing diagrams associated with the transmitter and receiver shown in FIGS. 22a, 22b, 23a and 23b.

BEST MODE FOR PRACTICING THE INVENTION

System Overview

Figure 1:
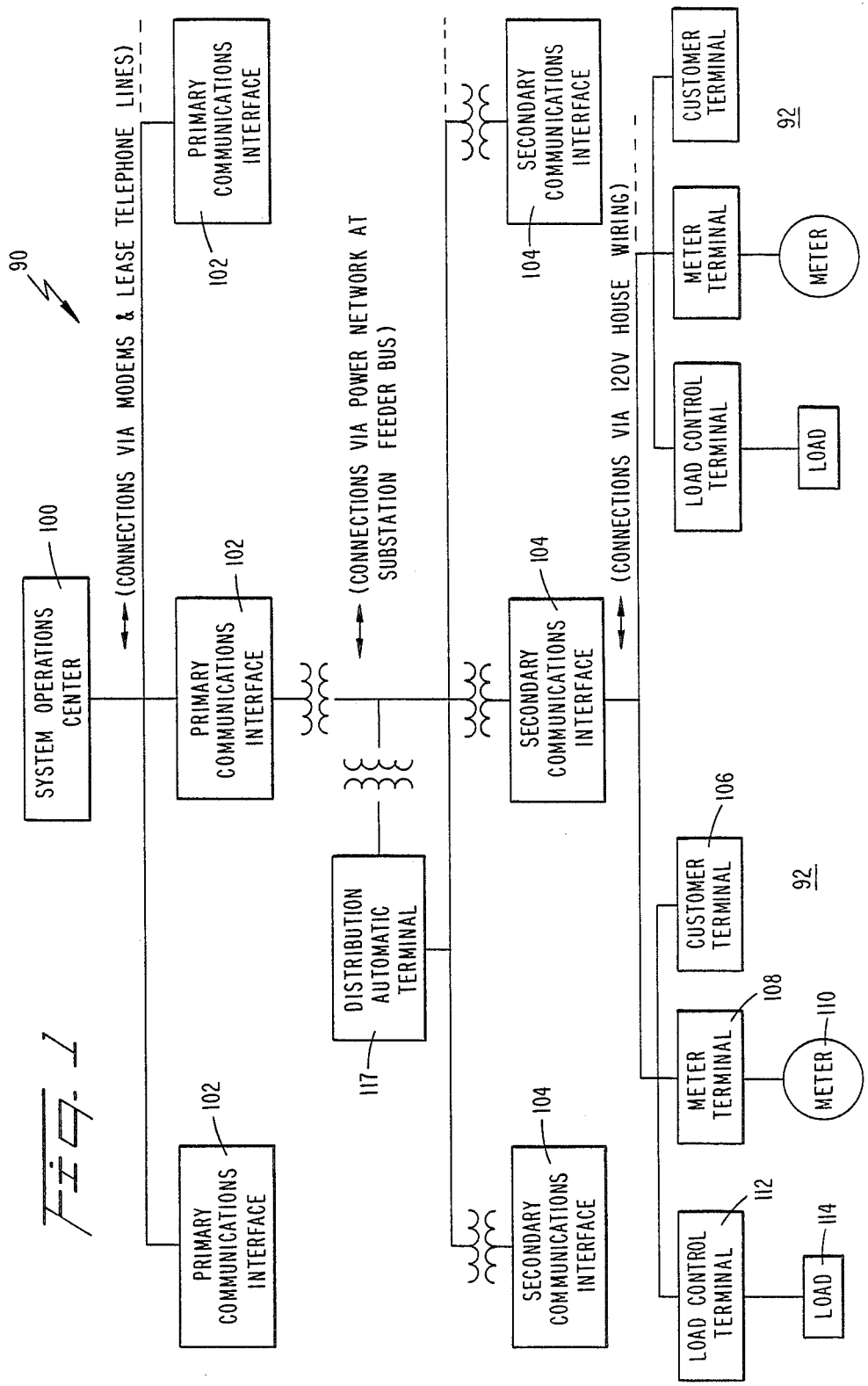
FIG. 1 is a general block diagram of a distribution energy management (DEM) system, in accordance with the invention.

Referring to FIG. 1, the system 90 shown therein, termed a "distribution energy management" (DEM) system, establishes, through a logical hierarchy, bidirectional communications between a system operation center (SOC) 100 and a network of geographically dispersesd customer load sites 92. The system architecture accommodates routing of control commands from the SOC 100 to the customer loads 92 and return of monitored data, providing full distribution automation and reporting, including meter reading, rate changing, load shedding and status reporting. The hierarchy underlying the DEM system uses the utility power network as the primary communications medium for large geographic dispersion of control and telemetry points within the system. The communication interfaces, therefore, provide the connections between discrete communications links to create a contiguous bidirectional communication channel between the SOC 100 and customer load sites 92.

SOC 100 is a centralized computer controlled by the utility-company to supervise and control distribution of energy throughout a region. The SOC 100, through its tree of PCIs and SCIs, monitors the distribution and consumption of energy at customer terminals by polling the terminals. The SOC thereby determines load consumption and accumulates billing data at each customer site.

SOC 100 communicates, via modems (not shown) over commercial telephone lines to a number of primary communications interfaces (PCI) 102. Each PCI 102, serving a particular geographic region, such as a neighborhood, is located at a distribution substation. PCI 102 is in communication, over commercial power lines, with a number of secondary communication interfaces (SCI) 104, each located on the low voltage side of an energy distribution transformer. Each SCI in turn communicates with a number of customer load sites 92 having customer terminals 106, meter terminals 108 having watt hour meters 110 and load control terminals 112 having customer loads 114. Power line communication between PCIs 102 and SCIs 104 is by direct sequence spread spectrum (DSSS) signal processing, to be described in detail hereinafter.

Each SCI periodically polls the user terminals assigned to it using phase shift keyed (PSK) modulation or other suitable modulation type. The SCI stores and calculates meter register readings and load status, interrupted only by messages from the PCI. To provide multirate and demand data to the user terminals, the SCI composes a meter response for each terminal as though it were a multi-register meter at the consumer site and is assigned the address of the user terminal. From this address, the user terminal can obtain all multi-register and rate in effect readings for display. The SCI pauses after transmitting each pseudo-meter message to enable the user to implement a voluntary load shed. On receipt of its pseudo-meter message, the present demand is compared against previously user keyboard entered demand, and initiates execution of a home load management program if the present demand exceeds the preset demand.

Polling of user terminals by the SCI is interrupted in response to receipt of a message from the PCI. A "read meter" or "read load" request by the PCI is formulated from previously polled data stored in the memory of the SCI, and transmitted back to the PCI. If a "load management" command is received by the SCI, the SCI transmits a message to its user load terminals, to initiate load management; thereafter, the SCI continues continuous polling of the associated user load terminals.

Distribution automation terminals (DAT) 117 at the substation feeder bus provide actuators and monitors for sectionalizing, VAR correction and transformer tap changing. Load status information, such as current and voltage magnitudes, power factor, etc., is supplied by each DAT 117 to its corresponding PCI 102.

SOC Message Protocol

The SOC 100 initiates all message exchanges within the DEM system 90. The particular types of information in PCIs 102 and SCIs 104 as well as at the customer load sites 92 are described in detail below. In general, however, for information resident at the PCIs 102, the SOC 100 requests information and the PCI responds with that information. For information or action resident at SCIs 104, the SOC requests the information or commands an action to be taken. PCIs 102 respond with an echo of the received command for verification. SOC 100 verifies that the PCI is set up correctly, and then transmits an execute command to the PCI which in turn responds with an execute response. The PCI 102 then composes and transmits the appropriate command to the desired SCIs. For polling PCIs to obtain requested information from the SCIs after executing a command, if either the requested information is not ready or if no information was requested, SOC 100 polls the particular PCI requested. The PCI 102 responds with its status. If the requested information is ready for SOC 100, the SOC polls the PCI 102, and the PCI responds with the information from a particular SCI 104. The SOC 100 then checks the received information for errors. If an error is detected, the SOC 100 will again poll the PCI 102; otherwise, the SOC 100 transmits an acknowledgment command. The PCI 102 generates an acknowledgment response.

The general format of data transmitted by SOC 100 is as follows:

STX ADDR CMND DATA CHECKSUM ETX

STX is the ASCII "start of text" character, to indicate the start of a message. ADDR is the address of the PCI that the message is to be supplied to or received from, and CMND identifies how much data follow and how the data are to be interpreted. DATA constitutes 0–200 characters of information, and CHECKSUM is an error detector which involves adding each byte in the message from the STX to the last data byte. Finally, ETX is the ASCII "end of text" character.

PCI 102 Overview

Figure 2:
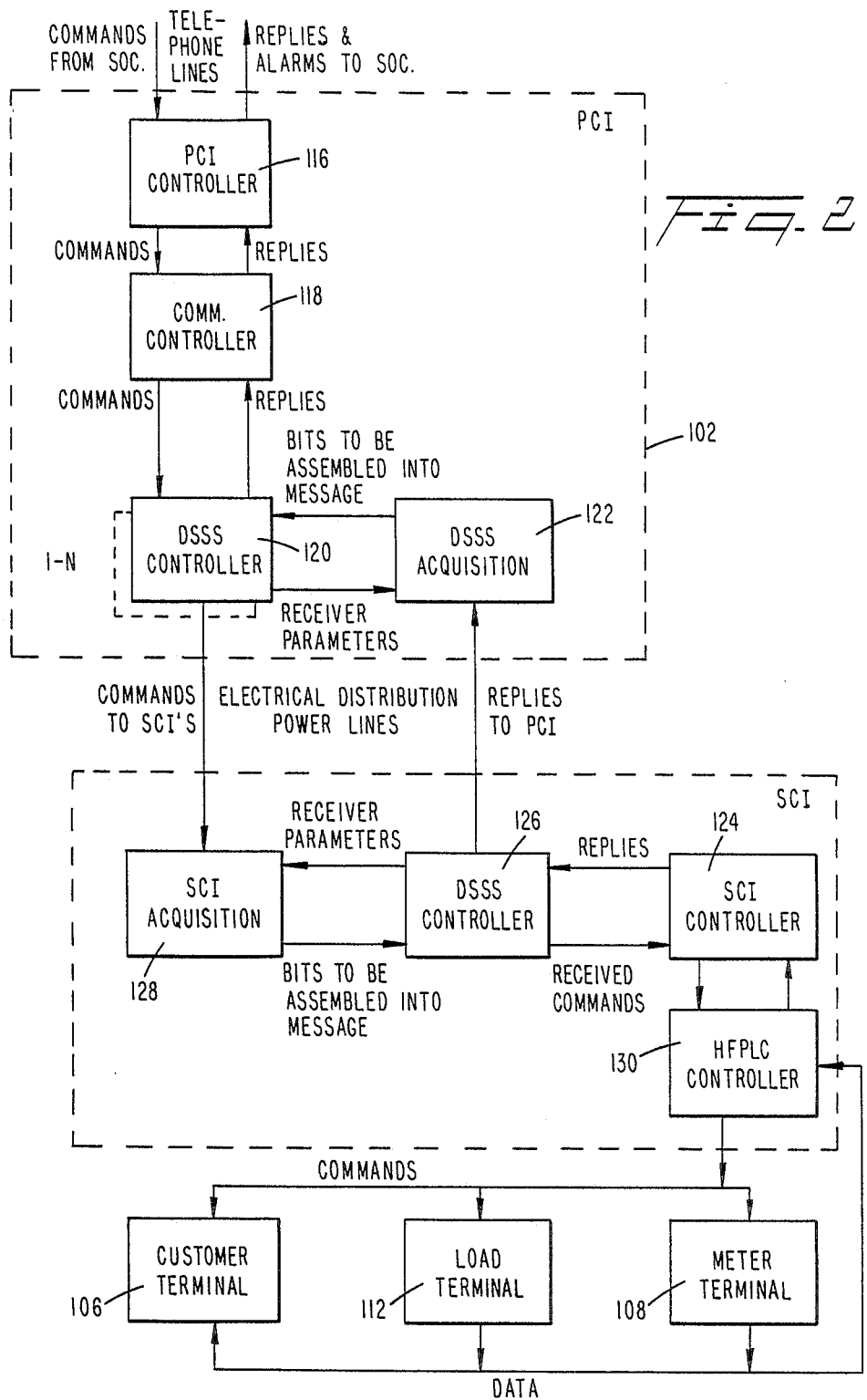
FIG. 2 is a more detailed block diagram of the primary control interface (PCI) and secondary control interface (SCI) within the DEM system of FIG. 1.

Referring to FIG. 2, each PCI 102 contains software embedded within a PCI controller 116 and a communication controller 118 to relay commands and data between SOC 100 and the SCIs 104. These commands include requests for communications statistics, requests for meter readings, parameter updates, etc. The PCIs 102 accumulate the required data from SCIs 104 to be transmitted to the SOC 100 upon request.

PCI controller 116 is a microprocessor programmed to interpret commands from the SOC 100, and to function as a communications concentrator for replies from the SCIs 104 to SOC 100. Controller 116 accepts commands from SOC 100 in a byte-oriented format and interprets those commands, in a bit-oriented format, for transmission to the SCIs 104, or responds to the SOC 100 with data held internally, if requested. PCI controller 116 further accepts replies from the SCIs 104 and forwards the replies to SOC 100 over the telephone lines via a conventional asynchronous communications interface adapter (ACIA) and a modem (not shown). Communication statistics relating to the telephone lines and power lines are maintained by the PCI controller 116, which notifies the SOC 100 of alarm conditions, such as power failures, communication failures, power restoration, communications restoration, etc.

Communications controller 118 is another programmed microprocessor that intercepts messages from PCI controller 116 and routes the messages to one of several direct sequence spread spectrum (DSSS) controllers 120. The controller 118 is in communication with controller 116 over a common bus. The communications controller 118 accepts responses from SCIs 104 and forwards those responses to PCI controller 116.

DSSS controller 120 controls spread spectrum transmission on the power lines, gathers power line communications statistics, such as communications reliability, signal voltage levels, correlation data, etc., and assembles bit-oriented data received from PCIs 104 into complete messages. Controller 120 is coupled bidirectionally with DSSS acquisition unit 122 which controls spread spectrum reception, receiving individual bits transmitted by SCIs 104 and passing those bits to the DSSS controller 120 to be assembled into complete messages. Acquisition unit 122 includes a line filter (not shown) which is a band pass filter for data communications over the electrical distribution power lines 132 and extracts from the lines 60 Hz. timing to which the spread spectrum communication is synchronized.

There are one controller 120 and acquisition unit 122 corresponding to each SCI 104 with which the PCI 102 is in communication. Thus, in an example wherein a particular tree includes four SCIs 104 in communication with a particular PCI 102, the PCI contains four units 120, 122 controlled by 118.

SCI 104 Overview

Each SCI 104 comprises an SCI controller 124 that interprets messages received from PCI 102 to take appropriate action, such as by returning statistics, controlling signal transmission and maintaining hardware control parameters.

DSSS controller 126, which is similar to controller 120 in PCI 102, controls transmitter hardware for spread spectrum transmission on the power lines, and assimilates received bits into complete messages. Controller 126 also gathers power line communication statistics to be supplied to SCI controller 124 for transmission to PCI 102 and then to SOC 100.

SCI acquisition unit 128, which is similar to acquisition unit 122 in PCI 102, receives bits from PCI 102 and passes the bits to the DSSS controller 126 for assimilation into complete messages.

High frequency power line carrier (HFPLC) controller 130 provides communication between SCI 104 and the units located at the customer load sites 92, that is, the customer terminal 106, the meter terminal 108 and the load terminal 112. Customer terminal 106, meter terminal 108 and load terminal 112 operate on command from SCI 104, either returning data to the SCI or performing some control operation. Communications between these units and the SCI is via the HFPLC controllers 130 using phase shift keyed (PSK) or other suitable type of modulation.

Meter terminal 108 counts pulses from the watt hour meter at the customer site to monitor power usage and control remote service disconnects. Upon request from SCI 104, meter terminal 108 delivers counts for kilowatt hour calculations to SCI 104 and terminates or restores service to the premises. Load terminals 108, on command from SCI 104, turn on or off loads to the premises to assist in balancing peak demands on the DEM system, in a process known as "load shedding". The loads that are typically shed during peak demand periods include water heaters, air conditioners, and the like. Customer terminals 106 display the condition, i.e., on or off, of various loads at the premises, displays power usage and projects the monthly bill of the customer based upon recent power usage. The terminal 106 also may provide billing for the customer.

DAT 117

The distribution automation terminal (DAT) 117 in FIG. 1 is shown in more detail in FIG. 3. Data that pass between the DAT 117 and PCI 102 are of the same generic structure as the data that pass between the PCIs 102 and SCIs 104. Each DAT 117 is hard wired to the PCI 102 that it controls, and maintains a data protocol (request, verify, execute and verify) to ensure that the DAT receives correct responses to its commands to avoid system failures, such as inadvertent cut-off of electrical service to customers. Data from SCIs 104 are carried by primary distribution lines 132 to DAT receiver 136 and DAT transmitter 146 over coupling networks 134 and 148, respectively. The receiver 136 and transmitter 148 are of the same type provided in PCIs 102 and SCIs 104, to be described hereinafter.

The DAT 117 controls standard sectionalizing switches, VAR correction capacitor banks, voltage regulating transformer taps, substation breakers (not shown), and the like, via drivers 142. The status of the various driven components is fed back by status monitor 144 for transmission back to PCI 102. The address of each DAT as well as the pseudo-random code to be transmitted by it is stored in a logic controller 138 resident in the DAT.

When a command is to be issued by the utility to DAT 117, a command message is transmitted by the SOC 100 to the DAT via a PCI 102. The particular DAT being called is identified by its address stored in controller 138. The addressed DAT 117 replies by echoing the command message, together with its address, whereby the utility verifies that the correct DAT received the correct command. If so, a second command by the SOC is issued. If the second command is received by the DAT 117 within a predetermined time period, and is the same as the first command, or is a specific execute command and there are no other intervening messages, the DAT performs the required function. DAT 117 then replies with another status message obtained from monitor 144 and with which the utility can verify the proper actuator operation.

Customer Load Site 92

Customer terminal 106 in FIG. 1, shown in more detail in FIG. 4a, comprises a control logic circuit 150 responsive to instructions and data from SCI 104 to communicate with loads at the user site. The customer terminal 106 further comprises a terminal transmitter 152 and a terminal receiver 154 interfaced to SCI 104 through coupling networks 156 and 158. Customer displays 160 may display to the user a signal indicating that load management is being implemented by the utility and the watt rate that is in effect. The status of each user load under utility control as well as various meter register displays can be provided at 160. Logic controller 150 responds to customer demand set point to cause shedding of loads to take place at the customer load site 92 under user control; this is particularly useful in utilities where a peak demand rate structure is in effect.

Load control terminal 112 in FIG. 1 is shown in more detail in FIG. 4b, wherein logic controller 162 is in communication with SCI 104 through a PSK transmitter 164 and a PSK receiver 166 as well as couplers 168, 170. The control terminal 112, located at the customer load site 92, removes power from the load to which the controller is connected in response either to a "disconnect" command from SCI 104 or from the customer terminal 106. Power to the designated load is maintained off until an "on" command is received from the SOC 104 or customer terminal 106, or until the expiration of a failsafe timer period established during installation of the terminal 112.

Power to the designated load is controlled by load actuator 170. The output of load actuator 170 is detected by a load status monitor 172 which determines the status of the actuator and transits the status to the SCI 104 upon receipt of a command from the SOC to read any data at the load control terminal 112.

Following a power outage, load control terminal 112 automatically removes power from load 114 to which the controller is connected. Thereafter, after a time period has expired, power to load 114 is automatically restored by load control terminal 112 under control of logic 162, unless the terminal 112 has previously received an "off" command from SOC 100 or customer terminal 106.

Meter Terminal 108

Figure 4C:
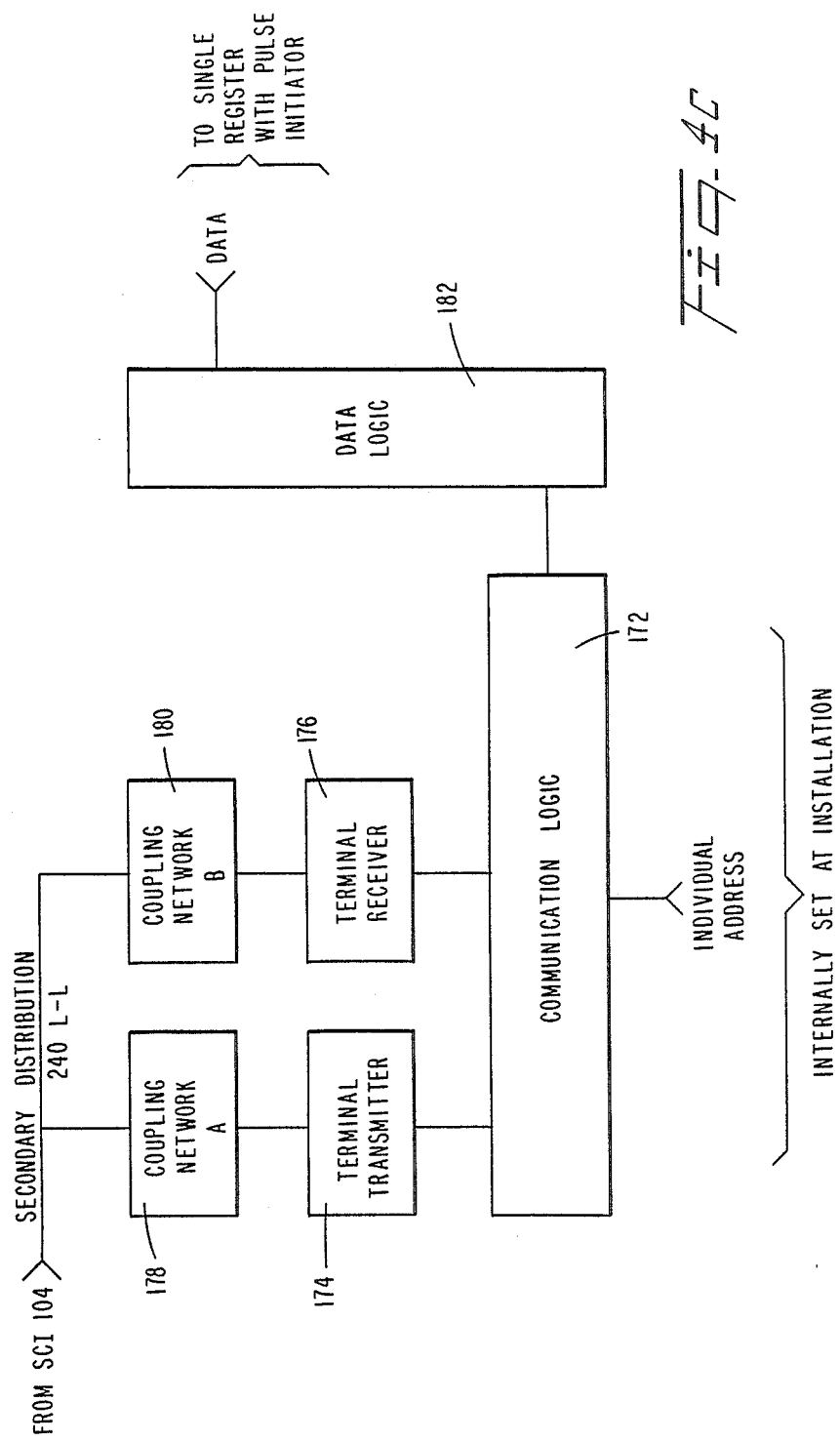

Meter terminal 108 shown in FIG. 1 is now described in more detail in FIG. 4c, wherein logic 172 responds to signals transmitted to it by SCI 104 via a communication link comprising PSK transmitter 174, PSK receiver 176 and couplers 178, 180. The meter terminal 108 reads single register meters equipped with pulse initiators. To implement a multi-rate structure, meter terminal 106 creates in effect a multi-register meter including a demand reading. The meter terminal 108, which includes base, shoulder and peak as well as demand reading meter are stored in memory in data logic 182. The demand interval upon which the demand reading is based is downloaded by the utility at SOC 100 to the meter terminal for storage in non-volital memory within 182. Transmitter 174 and receiver 176 employ PSK signal processing or other form of signal processing consistent with SCI 104.

HFPLC Controller 130

Referring again to FIG. 2, each SCI 104 contains a high frequency power line carrier (HFPLC) controller which establishes communications between the SCI 104 and the customer terminal 106, load terminal 112 and meter terminal 108 at the customer load site 92. The HFPLC controller 130 provides interface between the various terminals at the customer site and the PSK transmitter/receiver located in the SCI 104.

Figure 5:
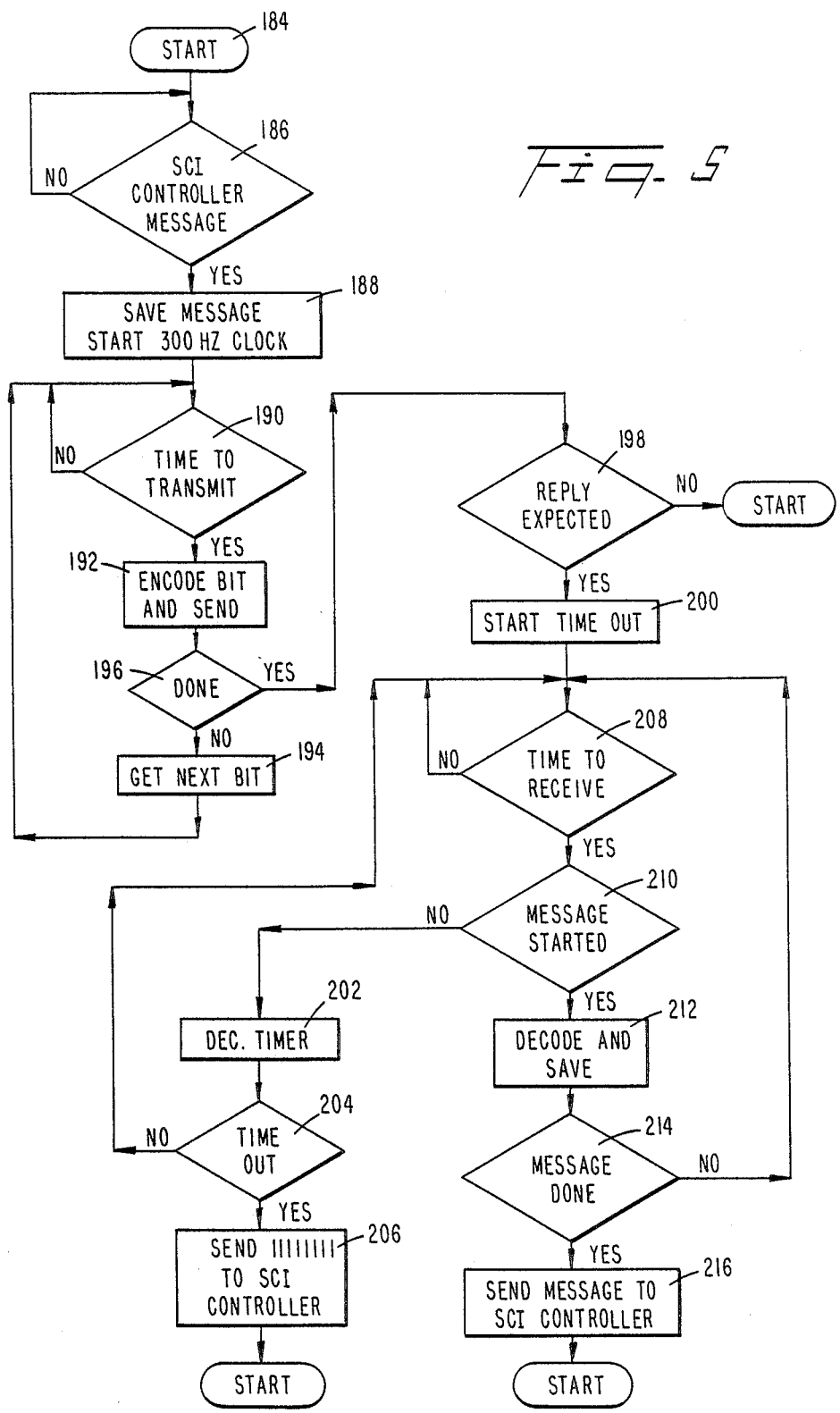
FIG. 5 is a flow chart describing the operation of a high frequency power line carrier (HFPLC) controller within the DEM system.

The operation of HFPLC controller 130 is summarized in the flow chart of FIG. 5 wherein, following "start" (step 184), controller 130 monitors the output of SCI controller 104 (step 186) and, in response to a message transmitted by the SCI 104, stores the message temporarily (step 188), and at a predetermined time, transmits the message (step 190) following formatting (step 192). The message bits are transmitted sequentially (step 194) until the message is completed (step 196).

If a reply from one of the user terminals is expected (step 198) a time-out period is intiated (step 200). If no message is received following the timeout period (steps 202, 204), an alarm is returned (step 206) to the SCI 104. If the message is received, on the other hand (steps 208, 210), it is decoded and saved (step 212) and, ultimately, enabled for transmission (step 214) and then transmitted to the SCI controller for confirmation.

Customer Load Site Polling

With reference again to FIG. 1, each SCI 104 controls a continuous polling of its meter 108 and load 112 terminals, storing meter register readings and load status, interrupted only by messages from the PCI 102 with which the SCI is in communication. To minimize storage, the following strategy requires the SCI 104 to know only the highest address of its meter and load terminals. The load terminals 112 are assigned addresses sequenty from one as they are installed. Meter terminals 108 are assigned odd sequential addresses from one as they are installed. When a customer terminal 106 is installed, it is assigned the even address which is one lower than its meter terminal and it is given the address of the load terminals at the site.

Polling now proceeds with the order being fixed, but arbitrary, dictated by installation considerations. SCI 104 requests that each load report its status in turn. Since the load terminal address is known by each corresponding customer terminal, the customer terminals each monitors its load status, which may be displayed to the customer. The response contains the absolute value of the single register meter reading as well as the multi-rate registers created within the meter terminal. The response updates the register in the SCI 104 corresponding to the rate in effect, and stores it in memory.

SCI 104 provides multi-rate and demand information to each customer terminal 106. To this end, SCI 104 composes a meter response message for each customer terminal 106 as though it were a multi-register meter address of the customer terminal. The customer terminal 106 recognizes its address to obtain all multi-register readings and rate-in-effect data for display. After transmitting each pseudo-meter message, the SCI 104 waits before using this communication link again. This pause is to allow the customer terminal that just received the message to implement voluntary load shed.

The customer terminal 106 accepts a demand level via an input mechanism, such as a thumb wheel (not shown) and on receipt of this pseudo-meter message, updates its displays and compares present demand against the demand level set by the customer. If the present demand exceeds set demand, the customer terminal 106 begins execution of a load management procedure.

Whenever an SCI 104 receives a message from its PCI 102, it interrupts its polling of the customer load sites 92 to respond to the message. Thereafter, the SCI 104 resumes polling.

PCI-SCI Communications

The message protocol between the PCIs 102 and SCIs 104 has the following format:

FLAG MFB ADDRESS CMD DATA FCS FLAG

The FLAG denotes the beginning and end of each message, and can have any of several different forms. It can, for example, be that used in standard data line control (SDLC) and HDLC communication protocols (01111110) with use of a 0-insert at the transmitter and a 0-delete at the receiver so that the FLAGs are unique within the message. In accordance with a second form, the FLAG may comprise stop and start bits in conjunction with detection of signal present.

The ADDRESS are two fields closely tied together such that message format bits (MFB) define the address structure used in the message. Each SCI 104 recognizes its ADDRESS in different addressing modes designated by the message format bits. One of the message format bits is used to indicate whether the command is a command for an SCI 104 or a distribution automation terminal (DAT).

An exemplary MFB field consists of three bits as follows:
Bit 1:
  1=DAT address
  0=SCI address
Bit 2:
  1=Group address
  0=Individual address
Bit 3:
  1=Extended address
  0=Short address The format of the address field depends upon whether the address is an individual address or a group address as defined by the message format bits. If the address field is that of an individual address, the field is an address of a length defined by the PCI 102 up to a predetermined number, e.g., 12, bits in length. This address is assigned by the PCI 102 to an SCI 104 (software address). The length of the address field and the software address are downloaded from the PCI 102 to SCI 104 to be stored in non-volatile memory at both the PCI and SCI. The length of the field may be changed as required by the addition or elimination of SCIs by issuing a command to each SCI redefining the address length. The extended address field consists of preferably 15 bits, 12 of individual address and 3 of the PCI address upon whose feeder the SCI is installed.

If the address field is that of a group address, the short address consists of another predetermined number, e.g., 7, of bits constituting a group; only one group can be addressed at a time. Under extended addressing, an 8 bit subgroup address is included with the 7 bit group address; only one subgroup can be accessed at a time. Under global addressing, all groups can be addressed at once; the group addressed in this case is a predetermined pattern, preferably all ones.

The CMD field is a fixed length field containing commands, operation and response identifiers. An example of a command is "read meter" whereby the SCI 104 polls the user terminals and solicits a reading of meter registers at the user terminal.

The DATA FIELD is a variable length field containing any data required or requested for the command response. For example, if a "read meter" command is executed in accordance with the CMD field, the meter register reading thus obtained is stored in the DATA FIELD.

Finally, the FCS field is a frame check sequence that provides error detection and possibly error correction.

All message protocol functions are implemented by microprocessor control, but may alternatively be provided by external hardware control.

Communication between SOC 100 and the PCIs 102 is, as mentioned, over owned or leased telephone lines via modems, although the communications medium in this link is not to be considered restricted to telephone lines and could utilize radio frequency, microwave or other facilities.

Communication between PCIs 102 and SCIs 104 as well as communication between SCI's 104 and the user sites is over commercial electrical power lines, wherein the PCI-SCI link is on the primary distribution power lines and SCI-user terminal link on the distribution lines.

To improve system response time and, of particular importance, to enable a large number of different communication channels to co-exist on distribution feeders having in practice an upper frequency bounded by 10 to 12 kilohertz, spread sprectrum communication is employed.

Spread Spectrum Signal Processing

Spread spectrum communication utilizes a wider bandwidth than the signal or data bandwidth would normally require. Herein, spreading of the signal bandwidth is accomplished by phase-shift keyed (PSK) modulation of a carrier waveform by data that is then PSK modulated by a reference pseudo-random code of length L running at a repetition rate of twice the data rate. As an example, the reference code may be a maximal sequence of 63 states, wherein two codes are contained in a data bit which, for a data rate of 30 bps, yields a 3780 bps chip rate. The bandwidth, containing 90 percent of the power, is 7560 hertz centered about the carrier frequency. A carrier frequency of 5670 hertz will then permit the system bandwidth to fall within the acceptable characteristics of the distribution power line.

To demodulate such a signal, the received signal is heterodyned or multiplied by the same reference code, and assuming that the transmitted and receiver codes are synchronous, the carrier inversions caused by the code PSK modulation if the transmitter is removed and the original base band modulated carrier is restored at the receiver. This narrow-band restored carrier can then flow through a bandpass filter configured to pass only the base band modulated carrier for extraction of base band data. Any incoming signal not synchronous with the receiver reference code is spread to a bandwidth equal to its own bandwidth plus the bandwidth of the reference code.

Because an unsynchronized input signal is mapped into a bandwidth at least as wide as the reference code, a significant amount of power of an undesired signal is rejected by the band pass filter. Thus, the receiver transforms synchronous input signals from the reference code modulated bandwidth to the base band modulated bandwidth whereas non-synchronous input signals are spread over the code-modulated bandwidth.

Synchronization processing makes use of the autocorrelation property of the code whereby correlation between the received and identical reference code is at a peak when synchronization is achieved and drops to a minimum when the synchronization difference approaches a code chip or greater. Because the sign of the pattern is dependent upon the data bit used to modulate the transmitter, it is possible to recover transmitted data at the receiver by monitoring the sign of the output voltage of the receiver when the receiver is properly synchronized.

Direct sequence modulation in the invention involves modulation of a carrier by a code sequence, such as biphase phase-shift keying. In biphase phase-shift keying (PSK), a balanced mixer whose inputs are a code sequence and an RF carrier controls the carrier to be transmitted with a first phase shift of $X°$ when the code sequence is a "1" and with a second phase shift of $(180+X)°$ when the code sequence is a "0". Biphase phase-shift key modulation is advantageous over other forms because the carrier is suppressed in the transmission making the transmission more difficult to receive by conventional equipment and preserving more power to be applied to information, as opposed to the carrier, in the transmission.

The type of code used for spreading the bandwidth of the transmission preferably is a linear code, particularly if message security is not required, and is a maximal code for best cross-correlation characteristics. Maximal codes are, by definition, the longest codes that could be generated by a given shift register or other delay element of a given length. In binary shift register sequence generators, the maximum length (ML) sequence is capable of being generated by a shift register having n stages $2^n-1$ bits. A shift register sequence generator is formed from a shift register with certain of the shift register stages fed back to other stages. The output bit stream has a length depending upon the number of stages of the register and feedback employed, before the sequence repeats. A shift register having five stages, for example, is capable of generating a 31 binary sequence (i.e., $2^5-1$), as its maximal length sequence. Shift register ML sequence generators having a large number of stages generate ML sequences that repeat so infrequently that the sequences appear to be random, acquire the attributes of noise, and are difficult to detect. Direct sequences are thus sometimes called "pseudo-noise" systems.

Properties of maximal sequences are summarized in Section 3.1 of *Spread Spectrum Systems*, Dixon, R. C., John Wiley & Sons, New York, 1976. Reference is also made to this text for a good general discussion of spread spectrum technology.

Properties of maximal sequences are summarized in Section 3.1 of Dixon and feedback connections for maximum code generators from 3 to 100 stages are listed in Table 3.6 of the Dixon text. For a 1023 bit code, corresponding to a shift register having 10 stages with maximal length feedback, there are 512 "1"s and 511 "0"s; the difference is 1. Whereas the relative positions of the 1s and 0s vary among ML code sequences, the number of 1's and the number of 0s in each maximum length sequence are constant or identical ML length sequences.

Because the difference between the number of 1s and the number of 0s in any maximal length sequence is unity, autocorrelation of a maximum linear code, which is a bit by bit comparison of the sequence with a phase shifted replica of itself, has a value of $-1$, except that the $0\pm1$ phase shift area, in which correlation varies linearly from $-1$ to $(2^n-1)$. A 1023 bit maximal code therefore has an average correlation value of 1024, a range of 30.1 db.

It is this characteristic which makes direct sequence spread spectrum transmission useful in code division multiplexing on the link between PCIs 102 and SCIs 104. Receivers set to different shifts of a common ML code are synchronized only to transmitters having that shift of the common code. Thus, more than one signal can unambiguously be transmitted on the link at the same frequency and at the same time. The transmitters and receivers are all synchronized to a common clock or timing source, developed herein by the zero crossover points of the AC power line voltage. The transmitters generate a common maximal length sequence with the code of each transmitter phase shifted by at least one bit relative to the other codes. Each receiver generates a local replica of the common transmitted maximal length sequence having a code sequence shift that corresponds to the shift of the particular transmitter to which the receiver is tuned. The locally generated sequence is autocorrelated with the incoming signal by a correlation detector adjusted so as to recognize the level associated with only $\pm$ one-bit synchronization to despread and extract information from only the signal generated by the predetermined transmitter.

Figure 6:
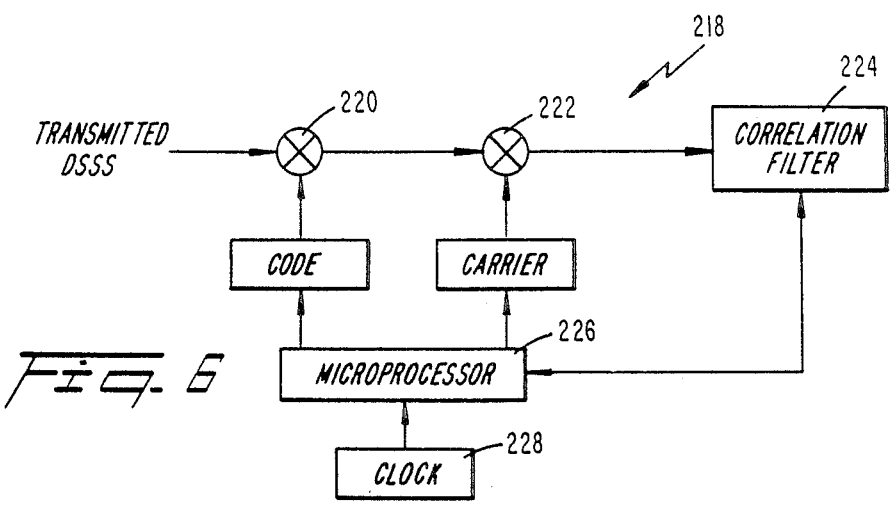
FIG. 6 is a simplified block diagram of a DSSS code division multiplex receiver used within each PCI and SCI.

Referring to FIG. 6, a basic spread spectrum receiver 218 incorporated in the invention receives a direct sequence spread spectrum (DSSS) signal transmitted by a particular transmitter among a plurality of such transmitters and processes the received signal to discriminate the signal transmitted by the particular transmitter from among the signals transmitted by all the transmitters. These receivers are incorporated in both the PCIs 102 and SCIs 104 to enable bidirectional communications to be established between each PCI and its associated group of SCIs. Bearing in mind that the received signal is modulated twice, that is, the carrier is modulated with data and then the composite is modulated by a pseudo-random code sequence to spread the composite over a bandwidth that is comparable to the bandwidth of the pseudo-random sequence, receiver 218 provides two stages of demodulation of the received signal to extract the transmission data. The received DSSS signal is first heterodyned or multiplied by the code of the particular transmitter whose signal is being discriminated from among the others. Thus, assuming that the codes generated at the transmitter and receiver within a PCI-SCI pair are synchronous, the carrier inversions caused by the code PSK modulation at the transmitter are removed at multiplier 220, and the original base-band modulated carrier is restored. The narrow-band restored carrier is applied to a bandpass filter (not shown) designed to pass only the base-band modulated carrier. Base-band data are then extracted by heterodyning or multiplying the restored data by a locally generated carrier at multiplier 222. The output of multiplier 222 is applied to a conventional correlation filter 224, such as an integrate and dump circuit, followed by a sample and hold circuit (not shown) which develops signals corresponding to the transmitted data.

The receiver 218 is controlled by a standard microprocessor 226, synchronized to a system clock, 228, which in turn is synchronized to the power line zero cross-over points, to which the transmitters are also synchronized. Because noise and undesired transmissions are treated in the same process of multiplication in multiplier 220 by the locally generated reference code that compresses the received direct sequence signal into the original carrier bandwidth, any incoming signal not synchronous with the locally generated reference code is spread into a bandwidth equal to the sum of the bandwidth of the incoming signal and the bandwidth of the reference code.

Figure 7:
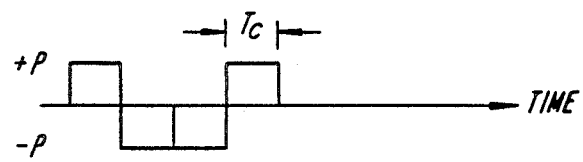
FIG. 7 is a representation of a bipolar pseudo-random pulse sequence.

In FIG. 7, a pseudo-random code on the communication link between PCIs 102 and SCIs 104 to which receiver 218 is tuned is bipolar, that is, it is assumed to switch polarities of a constant voltage supply. Bipolar, rather than unipolar, sequences are used to improve power transmission efficiency, since the carrier is suppressed in bipolar transmission. Bipolar transmission also avoids high concentration of energy in any frequency band to help avoid interference between transmissions by different transmitters on the power lines within the system. Each bipolar sequence has a magnitude P and a chip duration $T_c$. The length of the ML sequence depends on the number of different transmitters whose signals are to be code-division multiplexed in the system. Each transmitter is assigned the same transmission code having a different specified chip of the common ML sequence. The maximum number of transmitters that are capable of being multiplexed within the system thus corresponds to the length of the ML sequence.

The number of transmitters that may be multiplexed without interference within a code division multiplex system of this type is equal, theoretically, to the bit length of the sequence. For an ML code having a length of 63 bits, for example, the transmission channel is theoretically capable of multiplexing 63 different transmitters. This assumes that synchronization is deemed to be achieved between the receiver and a preselected transmitter when the autocorrelation between the code received from the transmitter and the locally generated code, both synchronized to the 60 Hz. power line, is at a peak. In practice, however, the number of transmitters that can be code division multiplexed in the system is much lower than the theoretical maximum, because there is overlap between neighboring correlation curves. This can be better appreciated with reference to FIG. 8 which shows a correlation curve for a single transmission and FIG. 9 which shows a number of correlation curves for neighboring transmissions, that is, for transmissions that are time offset from each other by a single code chip.

Figure 8:
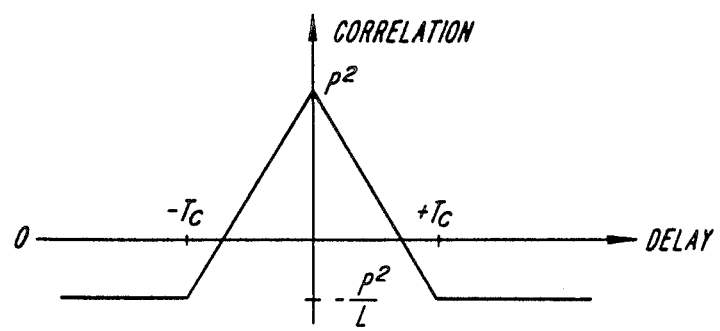
FIG. 8 is a diagram of an autocorrelation pattern for a bipolar pseudo-random pulse sequence of the type shown in FIG. 7.

In FIG. 8, the correlation curve has a magnitude $-P^2/L$ when the transmitted and locally generated code sequences are time offset from each other by greater than a code chip $T_c$, where P is the absolute magnitude of the sequence and L is the sequence length in bits. When the transmitted and locally generated codes are near synchronization, that is, are within a time offset of one code chip of each other, the correlation increases in magnitude to a peak of $P^2$ at perfect synchronization.

Thus synchronization between the receiver and a signal transmitter on the communication link between the PCIs 102 and SCIs 104 can be detected by monitoring the correlation output and deeming synchronization to exist when the correlation signal is above a predetermined positive value.

Figure 9:
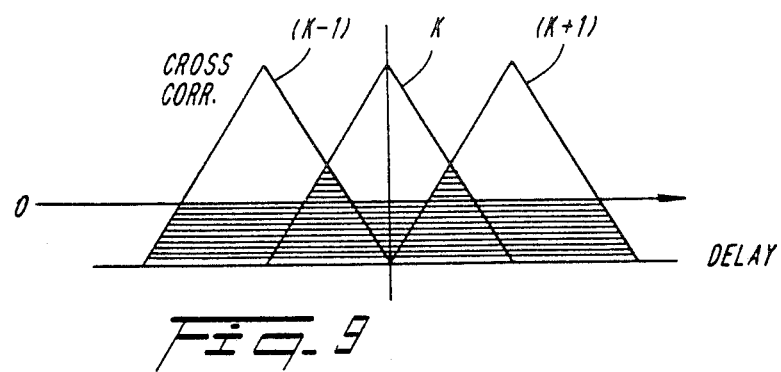
FIG. 9 is a superposition of several autocorrelation patterns corresponding to neighboring code division multiplex transmitters.
Figure 10:
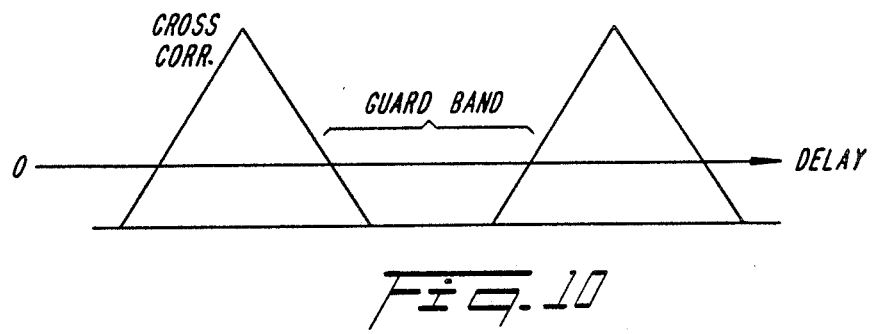
FIG. 10 is a diagram corresponding to FIG. 9, with signals of neighboring transmitters separated by guard bands.

Assume, however, that as shown in FIG. 9 there are three transmitted code sequences k, k−1 and k+1, time shifted from each other by a single code chip. Each correlation has a positive peak value $P^2$ and a negative peak value of $-P^2/L$, as in FIG. 8. The correlation curves of neighboring code sequences overlap, within the regions shown by cross-hatching in FIG. 9. In these regions, neighboring code sequences have common correlations, making it impossible to distinguish between transmissions. As a practical matter, to avoid interference between transmissions, it is necessary to insert a guardband between sequences, as shown in FIG. 10. This is provided by assigning transmissions to sequence shifts corresponding only to alternate code chip delays, rather than to every code chip delay as in FIG. 9. The result is that, at best only one-half the number of transmissions, compared to the theoretical maximum number, can be multiplexed. In practice, even fewer than one-half the theoretical maximum transmitters are capable of being multiplexed in a single code division multiplex system using bipolar sequences because the guardband that is greater than that provided using only alternate code shift delays is required to avoid synchronization ambiguities.

The number of transmitters that are capable of being multiplexed is increased herein to one fewer than the theoretical limit by cross-correlating the input signal with a trinary code developed by obtaining the difference between the code sequence assigned to the particular transmitter to which the receiver is tuned and a code sequence that is unassigned. In other words, two bipolar sequences are developed at the receiver, one being the replica of the common code sequence transmitted by all the transmitters and having a code sequence that corresponds to the sequence shift of a predetermined one of the transmitters, and the second being a replica of the common bipolar sequence and having a code sequence shift that is not assigned to any of the transmitters, as taught in U.S. patent application Ser. No. 592,669, filed on Mar. 24, 1984, and assigned to the assignee of this invention. One of the locally generated codes in accordance with that technique is subtracted from the other, and the resultant, which is a trinary code sequence, is correlated with the incoming signals. The sequence shift of the trinary code sequence is brought to within one code chip of the sequence generated by the preselected transmitter using static synchronization. Perfect synchronization between the receiver and preselected transmitter is obtained using dynamic synchronization obtained by successively shifting the timing of the receiver by a fraction of a code chip and monitoring the output of the correlator. When the correlation output is at a peak, the receiver and preselected transmitter are considered to be synchronized to each other. Assuming now that the receiver and transmitter are also synchronized to corresponding zero cross-over points of the AC power line, the polarity of the correlation output is monitored to extract the transmitted data.

Figure 11A:
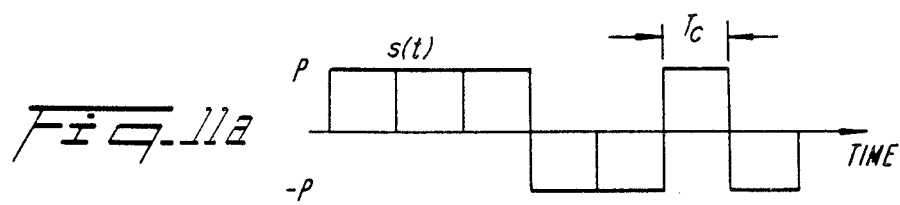
FIGS. 11a–11d are waveforms showing trinary code generation.
Figure 11B:
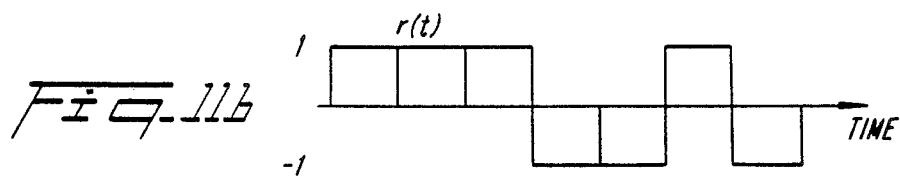

Development of the trinary pulse sequence to be cross-correlated with the transmitted sequences is better understood with reference to FIGS. 11a–11d. In FIG. 11a, a transmitted bipolar sequence s(t) having an absolute magnitude P and chip period $T_c$ is shown. This sequence is a simplification of an actual sequence which, in practice, would be substantially longer, e.g., 63 bits. Within the receiver is developed a first reference pulse sequence r(t) shown in FIG. 11b. The sequence r(t) is identical to the sequence s(t) transmitted by the predetermined transmitter shown in FIG. 11a, because the transmitter and receiver sequences have the same delay and are presumed synchronized to each other.

Figure 11C:
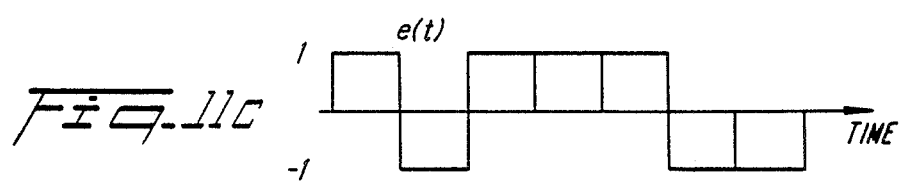
Figure 11D:
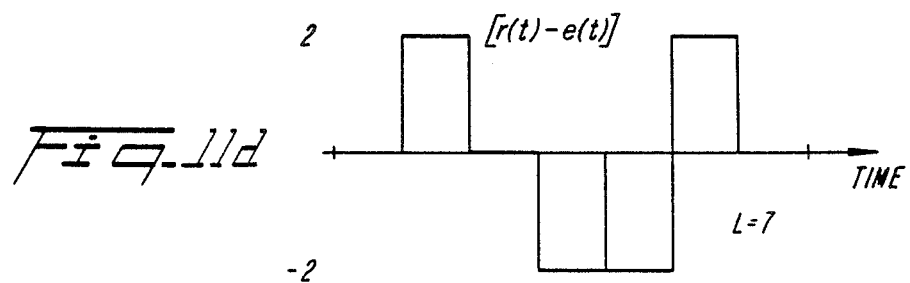

The receiver generates a second reference pulse sequence e(t), shown in FIG. 11c, which is the same sequence as the one transmitted by the preselected transmitter as well as by all the other transmitters but has a sequence delay that is not assigned to any of the transmitters.

The difference [r(t)−e(t)] between the two locally generated reference pulse sequences is obtained, to provide the trinary pulse sequence shown in FIG. 1d. The trinary sequence has a value [+2, 0, −2], depending upon the relative binary values of the two reference pulse sequences r(t) and e(t).

It is to be understood that the sequence length in the example shown in FIG. 11 is 7 bits, although in practice, much longer sequences would be applied to accommodate a relatively large number of transmitters to be code division multiplexed.

Figure 12:
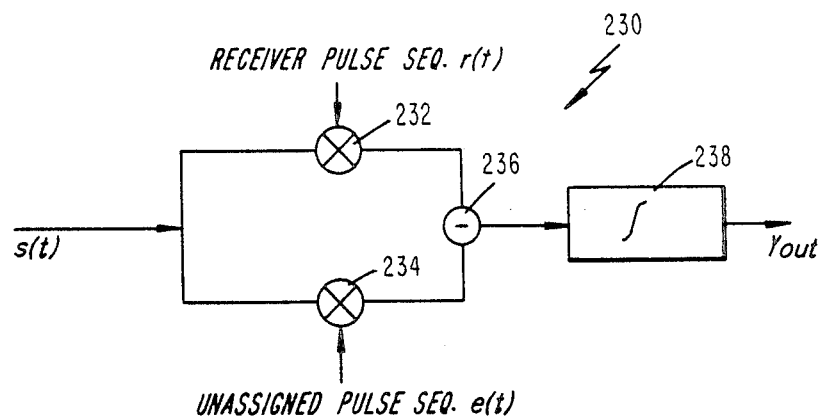
FIG. 12 is a simplified block diagram showing a receiver of a type incorporated within a PCI or SCI and operated in accordance with the principles of the invention.

Referring to FIG. 12, development of the trinary reference sequence to be cross-correlated with incoming bipolar pulse sequences for signal demultiplexing is provided in a receiver 230. The receiver 230 receives the transmitted pulse sequences s(t) and applies the incoming sequences to the inputs of a first correlation multiplier 232 and a second correlation multiplier 234. The first correlation multiplier 232 multiplies the incoming sequences s(t) by the locally generated reference pulse sequence r(t) having a sequence shift corresponding to the sequence shift of the preselected transmitter. The multiplier 234 multiplies the incoming sequences s(t) by the pulse sequence e(t) having an unassigned pulse sequence shift. The resultant multiplication products are applied to a difference circuit 236, and the difference is integrated and sampled in a standard correlation filter 238 to develop an output signal $y_{out}$.

It is pointed out that in FIG. 12, the input sequences s(t) are first multiplied respectively by the two reference pulse sequences r(t) and e(t), and then the product difference is obtained in difference circuit 236. This is equivalent to obtaining the difference between the two reference pulse sequences r(t) and e(t) and then multiplying the differences by the incoming sequences s(t).

Figure 13:
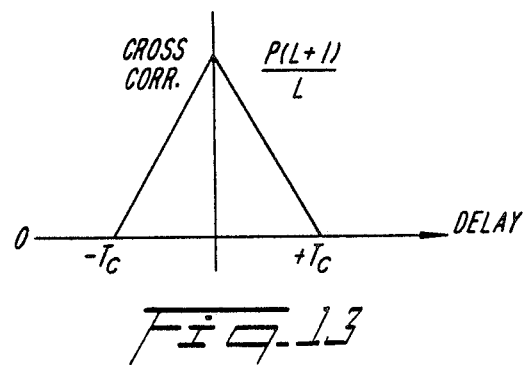
FIG. 13 is a diagram showing an idealized cross-correlation pattern between locally developed trinary code sequences and an incoming binary code sequence, in accordance with the invention.

The resultant cross-correlation is shown in FIG. 13. Note that each correlation curve has a value 0 when the preselected transmission and locally generated reference sequence r(t)-e(t) are displaced from each other by more than one code chip. This contrasts with the cross-correlation curve of FIG. 8, wherein there is a negative residual correlation having a magnitude $P^2/L$. The magnitude of the correlation curve increases linearly to a peak value of $(P(L+1)/L$ when the preselected transmitted and locally generated reference pulse sequences are synchronized.

Figure 14:
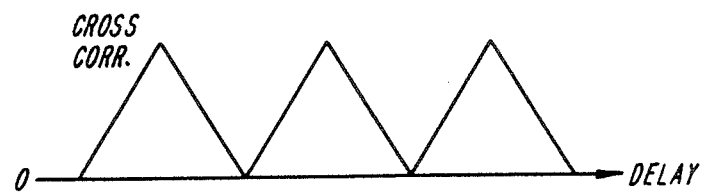
FIG. 14 is a correlation pattern developed by multiple channel correlation detectors using principles employed in the invention.

The advantage of this correlation strategy is appreciated by comparing FIG. 14 showing the correlations of a number of neighboring transmissions in accordance with the invention and FIG. 9. In particular, FIG. 14 shows codes with a separation of 2 code chips. However, it will be appreciated that the FIG. 14 transmissions can be displaced from each other by a single code shift and that there is no overlap between the correlations of adjacent transmissions, whereas in FIG. 9, overlap occurs in the cross-hatched portions. This enables the number of transmissions capable of being multiplexed to be equal to one fewer than the length of the pulse sequence in bits, a result that is not possible using other systems. Even if a guard band is placed between transmissions in the strategy shown in FIG. 14, the number of transmissions that can be reliably multiplexed is substantially greater than the number that can be reliably multiplexed using the correlation strategy shown in FIG. 9. Mathematical basis for the technique is given in U.S. patent application Ser. No. 592,669, supra, incorporated herein by reference.

Synchronization

The receiver and preselected transmitter within a PCI-SCI pair in communication must, as discussed earlier, be time synchronized to each other before data can be extracted. Assuming that the receiver and transmitter are synchronized to a common timing source (the 60 Hz. power source), synchronization is a matter of adapting receiver timing to different propagation delays of the transmitted signal as well as to the timing signal and to delays inherent in the transmitter and receiver. Some of these delays are fixed, and can be compensated using a "static" delay, to synchronize the receiver and predetermined transmitter to within one code chip of each other, wherein a chip is defined as the bit period of the pseudo-random code generator.

In general, static delay can be compensated during initial calibration of the receiver, since most static delays are fixed. A difficulty occurs, however, when the transmission medium is a transmission line with the transmitter and receiver synchronized to a common timing source, and wherein communication between the two units is bidirectional. Static delay must thus be examined from two reference points, one where the transmitter is at the timing source and the other where the receiver is at the timing source.

With the transmitter located at the timing source and the receiver located elsewhere, the timing signal and transmitted signal will propagate at approximately the same speed from the transmitter to the receiver. Other timing variations between the transmitter and receiver are due to delays induced within the transmitter and receiver circuitry, and can be preset to synchronize the transmitter and receiver to within one code chip of each other. All receivers remote from the timing source can thus have identical static delays.

If the receiver is located at the timing source and the transmitter is located elsewhere, however, each receiver may require a static delay that is unique for each remote transmitter to account for different signal propagation distances. Thus, to enable a receiver to receive signals from a multiplicity of transmitters, the static delay of the receiver must be variable. In practice, the static delay between each transmitter and the receiver is measured upon installation of the transmitter at the PCI 102 or SCI 104; that static delay value for all future communications with a particular transmitter is preset within the receiver. Whenever a transmission is received from the transmitter, to obtain united synchronization of the transmitter, receiver timing is automatically adjusted to accommodate the delay associated with the particular transmitter.

Static Synchronization

Static synchronization is obtained using a masterslave arrangement, wherein one transmitter/receiver unit, called the master station, in a PCI acts as the source of timing signals for the SCIs with which it is in communication. The amount of delay associated with the timing signals between the PCI 102 and each of the SCIs 104 includes such factors as the filter delay for the timing signal source at the PCI, the received filter delay at the PCI, the signal propagation delay between the PCI and a particular SCI, the coupling delay at the PCI and the transmit filter delay at the PCI. Knowledge of these various delays will give an estimate of the amount of static delay associated between the PCI and a particular SCI. However, some variation in each delay will occur with changes in the transmission line associated with temperature changes, transmission frequency, etc.

While dynamic delay adjustments can take care of most of these changes in the static delay characteristics between the PCI and SCIs, the multiplexing capabilities of the system may be somewhat reduced because the receiver at a particular PCI or SCI must be capable of tracking delay variations over a range of several code chips. This requires a guard band that is wide enough to allow the signals of two adjacent receivers to vary in time over their associated bands without interference.

However, it has been discovered that the amount of required guard band may be reduced by periodically measuring, at the PCI 102, the static delays associated with signal transmission between the PCI and each of its associated SCIs and then periodically adjusting the transmitter signal timing at the SCI in order to bring the static delay back into a desired range. This allows more SCIs to transmit at one time since the guard band required for delay variations can be greatly reduced thus allowing more usable code delays for multiplexing.

Variations from synchronization established by the static delay are compensated by a dynamic delay mechanism within each receiver. The dynamic delay consists of two stages: fine tuning and coarse tuning. Whereas static delay timing causes the receiver and predetermined transmitter to be synchronized to each other to within one code chip, fine tuning uses correlation detection to make fine adjustments in receiver timing as a function of received transmission, rather than as a function of an expected transmission (static delay).

After fine tuning has established that receiver timing is at a local correlation peak, it becomes necessary to determine if the local peak to which the receiver it timed is the "correct" local peak for best correlation. This is necessary because, depending upon the correlation properties of the code selected, as well as other factors, there are likely to be multiple correlation peaks, with the primary local peaks having the greatest peak magnitude. These multiple peaks arise from carrier correlation within the $\pm 1T_c$ code correlation peak. Finally, it must be determined which of the system timing pulses present in each data bit is the proper one for synchronization. Without such a determination, a condition can exist wherein the transmitter is locked to one 60 Hz. timing pulse while the receiver is locked to another 60 Hz. timing pulse. This is because there are two timing pulses in a data period and incorrect timing causes a quadrature condition between transmitter and receiver data periods. Thus, the net energy for such quadrature data periods is zero. Even with the receiver and transmitter properly synchronized to each other, data cannot be extracted from the received sequence because it is not possible to detect and decode the data transmission unless the receiver and transmitter are locked to the same timing pulses. Fine tuning and coarse tuning as well as synchronization to the proper timing pulse within each data bit shall now be described in more detail.

Figure 15:
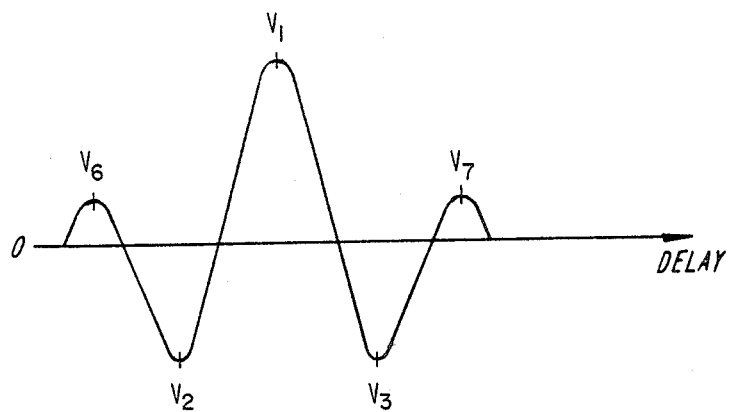
FIG. 15 is a correlation pattern obtained in a receiver in accordance with the invention when operated in the presence of various degrading factors associated with power lines.

FIG. 15 is a correlation pattern obtained by cross-correlating an incoming, bipolar pulse sequence together with its carrier and the locally generated trinary reference sequence. The correlation pattern has a major peak at receiver timing V1 and has minor correlation peaks at receiver timings V2, V3, V6 and V7, referred to hereinafter as "channels". The correlation peak at primary channel V1 depends upon the correlation properties of the code selected as a function of code chip time delay difference between the incoming code sequence and the reference code sequence. As discussed earlier, the correlation is at a peak when synchronization between the receiver and transmitter is achieved, with the absolute value of the correlation dropping to zero as the synchronization difference approaches a code chip or greater. It should be noted that, due to imperfect correlation properties of the code and due to the influence on correlation by the sinusoidal carrier, the correlation shown in FIG. 15 is approximately sinusoidal as compared to the piecewise linear, ideal correlation profile shown in FIG. 14 which does not include a carrier. This is the reason that coarse tuning is required; fine tuning adjusts receiver timing until a correlation peak is determined; coarse tuning then determines whether the correlation peak is the major correlation peak associated with channel V1 or is a minor correlation peak associated with channels V2, V3, V6 or V7, or others.

In accordance with one aspect of the invention, synchronization of the receiver within the PCI 102 and SCI 104 is achieved by providing a plurality of separate subreceivers or correlation detectors that are tuned to each receiver channel. Assuming that each of the channels V1, V2, V3, V6 and V7 are spaced from each other in time by one-third of a code chip, fine tuning adjusts the receiver timing such that the channels are all located at local peaks. Furthermore, assuming that channel V1 is within a code chip of being synchronized, the channel V1 is within one-sixth of a code chip of a local peak. The outputs of the correlation detectors are applied to a microprocessor 240 (FIG. 21) to develop a receiver timing signal for synchronization to the transmitter and to extract transmission data. Correlation detection shall be described hereinafter in connection with the detailed implementation of the system.

Dynamic Synchronization

As discussed above, static synchronization involves establishing predetermined delays in the receiver that correspond to different propagation times associated with different transmitters. Static delays, preset in the receiver during initial set-up, synchronize the transmitter and receiver to within one code chip of each other. Perfect correlation is then established by microprocessor 240 in response to the correlation signals developed by the correlation detector shown schematically in FIG. 22. Microprocessor 240 more specifically processes the channel correlation signals to control receiver timing to synchronize to the predetermined transmitter in two stages, namely, fine and coarse tuning, followed by synchronization correction, if necessary, to the proper pulses of the system clock.

Referring again to FIG. 15, it is recalled that code correlation is a function of code chip time delay differences between a received code and a reference code and, depending upon the particular correlation properties of the code employed, has a peak when synchronization is achieved and has an absolute value that drops to zero as the synchronization difference approaches a code chip or greater. Data are recovered from the correlation pattern, based upon the recognition that the sign of the pattern depends upon the data bit used to modulate the transmitter. Thus, when the receiver and a predetermined transmitter are properly synchronized to each other, transmitted data are recovered by monitoring the sign of the voltage V1 at the primary correlation channel.

Fine Tuning

Referring to FIG. 17, a correlation pattern corresponding to the correlation pattern shown in FIG. 15 is identified by 1100. This is an "in-phase" correlation pattern, with coarse correction channels V1, V2, V3, V6 and V7 that are used to determine which of the correlation peaks correspond to the primary channel, with maximum correlation at synchronization. It should be recognized, of course, that all references to fraction of a code chip are related to the ratio between the carrier frequency and code generation frequencies. As one example, in the preferred embodiment, the carrier frequency is 5670 Hz, and the code generation frequency is at 3870 bits/second, so that references to fractions of a code chip are related by a ratio of 3/2, allowing three peaks per code chip. The additional correlation curve 1200 in FIG. 17 is a quadrature-phase correlation curve that is displaced from the in-phase correlation curve by 90 degrees. The significance of the quadrature-phase correlation curve is that the value of the quadrature-phase curve is at zero when the value of the in-phase quadrature curve is at a maximum. As shall be discussed below, signal processing, and particularly correlation peak detection, is simplified using quadrature-phase correlation.

Because there are three correlation peaks per code chip, assuming that the primary correlation channel V1 is within a code chip of being properly synchronized, the primary channel V1 is within one-sixth of a code chip of a "local" peak. Fine tuning causes the receiver to adjust its timing, under control of microprocessor 240, such that the correlation channels V1, V2, V3, V6 and V7, spaced apart from each other by one-third of a code chip, are all located at local peaks. One method of adjusting receiver timing to locate the five correlation channels to local peaks is by the use of a channel whose timing is generated with a quadrature-phase carrier. Recognizing from FIG. 17 that the nulls of the quadrature-phase correlation pattern 1200 occur at the peaks of in-phase correlation pattern 1100, an error voltage may be developed by microprocessor 240 based upon the sign of the product of the in-phase and quadrature-phase patterns. The sign of the error voltage thus indicates a direction to which receiver timing must be shifted to cause the receiver correlation channels to synchronize to local correlation peaks.

Signal Presence Detection

The provision of quadrature-phase V1q as well as in-phase V1 correlation voltages furthermore makes it possible to determine a signal present within a background of noise. As summarized in the program flow chart of FIG. 23, when only noise is present at the receiver input, both the in-phase V1 and gradrature-phase V1q voltages will have approximately the same value K, such that the ratio V1/V1q will be close to unity. With both signal and noise present, however, fine tuning maximizes V1 and minimizes V1q to obtain a ratio much greater than unity. The ratio V1/V1q is thus used as an indication of signal present. In practice, the ratio may be monitored over a number of data bits, with smoothing techniques or majority voting being applied to ensure accuracy.

Figure 22:
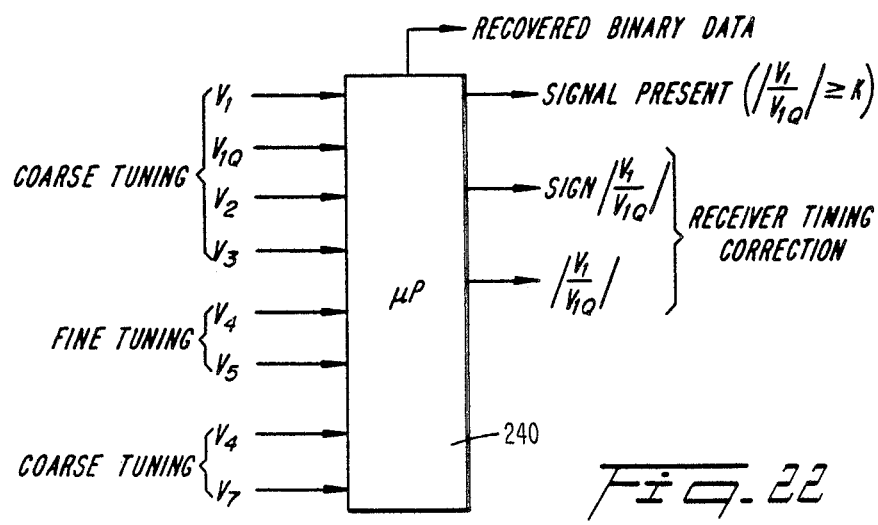
FIG. 22 is a diagram of a microprocessor based circuit for performing data recovery in the receiver.

Circuitry for detecting presence of a signal in a background of noise is shown in FIG. 22, with microprocessor 240 developing signals V1 and V1q in response to the outputs of the correlation detectors discussed above. The signals V1, V1q are processed with the microprocessor 240 to develop the ratio V1/V1q and the absolute value V1/V1q of the resultant is magnitude compared with a predetermined threshold magnitude to determine whether an incoming signal represents a data transmission or whether it is merely noise.

Following determination that the receiver is tuned to a local peak using fine tuning as described above, it becomes necessary to determine through coarse tuning, whether the current local peak is the "correct" local peak such that the receiver has best correlation.

Coarse Tuning

Coarse tuning of the receiver to a predetermined transmitter to ensure that the receiver is tuned to the maximum, and other than a secondary, correlation peak involves serial hunting wherein, having once fixed a point as a local peak, the receiver is adjusted in multiples of one-third of a code chip to measure the magnitude of the receive signal at each adjacent local peak. Once the magnitudes of the peaks are determined, a decision as to the proper peak is made. Because the magnitudes of adjacent peaks near the center of the correlation pattern are difficult to distinguish from one another due to channel filter distortion, a conventional "center-of-mass" approach may be used to identify the maximum local peak by basing the decision on the relative values of all channels rather than on only a selection of the channel having the greatest correlation magnitude.

The microprocessor 240 is programmed in a coarse tuning, serial hunt mode to cause the receiver, following identification of a local peak, to shift in timing by multiples of one-third of a code chip, measure and store correlation magnitudes and make comparisons using the center of mass approach or other approach to identify the correct correlation peak. Serial hunting requires a transmission preamble of length W . s where W is the width of the peak search range (in thirds of a code chip) and s is the number of bits of smoothing in the voltage readings.

In FIG. 19, a simplified flow chart of programming of microprocessor 240 to provide coarse tuning by serial hunting includes a test at step 1200 to determine, using fine tuning as discussed above, whether the receiver is at a local peak. If the receiver is not at a local peak, the receiver is fine tuned until the receiver is determined to be at a local peak. Once at a local peak, the receiver is incremented (step 1202) until its timing is at K+N, wherein K is the timing of the local peak obtained during fine tuning and N is a predetermined number of thirds of a code chip. The correlation value of K+N is measured and stored (step 1204), and the receiver timing is decremented by one-third of a code chip (step 1206). The correlation of the receiver and predetermined transmitter is now measured and stored (step 1208), and receiver timing is tested to determine whether it is at (K−N), that is, at the opposite side of the initially detected local peak (step 1210). If not, the receiver timing is again decremented and the correlation is measured and stored. Otherwise, all the stored correlations are tested (step 1212) to identify a peak correlation.

In accordance with another embodiment, to reduce the preamble length, multiple secondary receiver channels, offset from each other by multiples of one-third of a code chip on both sides of the primary channel V1 develop primary and secondary correlation signals to be applied to microprocessor 240. The microprocessor 240 is programmed, using center of mass analysis or other analysis, to identify the primary channel V1 which has the greatest maximum correlation and the secondary channels. By using a multiple number of receiver channels or correlation detectors, rather than serial hunting circuitry or programming, the length of the preamble required for coarse corrections may be reduced to the number of bits of smoothing, s. This assumes, of course, that for the desired width of search, a channel exists with common offsets of multipels of one-third of a code chip on both sides of the primary correlation channel V1.

With multiple receivers it is not necessary to program the microprocessor to serially hunt. The microprocessor 240 is instead programmed to simply compare the outputs of the correlation detectors, all tuned to a local peak, to identify the peak having the greatest magnitude.

Timing Signal Correlation

Because the data bit rate of the transmission is less than one-half the pulse repetition rate of the 60 Hz line voltage synchronized timing source, the transmitter and receiver may become locked to different timing pulses even though they appear to be perfectly synchronized to each other. For example, for a data bit rate of 30 bits per second, the timing pulse source of 60 Hz and a carrier frequency located between 60 Hz harmonics, the transmitter may become locked to a first 60 Hz timing pulse with the receiver locked to the next successive 60 Hz timing pulse. An alternating data transmission will not be detected due to improper receiver data timing recovery with otherwise perfect synchronization between the receiver and transmitter.

To illustrate this condition more clearly, FIG. 20a is a diagram representing the 60 Hz line timing pulses to which the receiver and a predetermined transmitter are synchronized. The transmitter carrier is shown in FIG. 20b and transmitted data representing alternate ones and zeros are shown in FIG. 20c. Assuming that the receiver and transmitter are synchronized to the same 60 Hz timing pulses, the integrate and dump circuits of the receiver will be synchronized to the transmitted data inversions so as to dump at the trailing edge of each datum, as shown in FIG. 20d, where "dots" designate integration dump points. The sampled integrator output is thus a replica of the data embedded within the transmission.

If the transmitter and receiver are not synchronized to the same timing pulses, however, the intragrate and dump circuits will not be properly synchronized to the data being transmitted. This condition is shown in FIG. 21c, where the integration dump points occur between transmission data inversions, and the sampled output of the integrator is at zero.

In other words, with the receiver and transmitter respectively synchronized to successive, rather than the same, timing pulses, it is impossible to recover any of the transmission data. It is therefore necessary to test the receiver and transmitter to ensure that the two units are synchronized to the same, rather than successive, timing pulses.

In accordance with one aspect of the invention, associated with the primary receiver channel V1 is a secondary receiver channel V1' having a built-in additional delay of one-half a data bit. One of the two channels V1 and V1' will always therefore detect the transmitted signal. A determination is made by applying an alternating data preamble associated with the transmission to the primary and secondary receiver channels. By comparing the magnitudes of the correlation outputs of the two receiver channels, the correct channel (having the larger correlation magnitude) is the one synchronized to the same timing pulse as the transmitter is. Data are monitored at the "correct" channel only.

Figure 21:
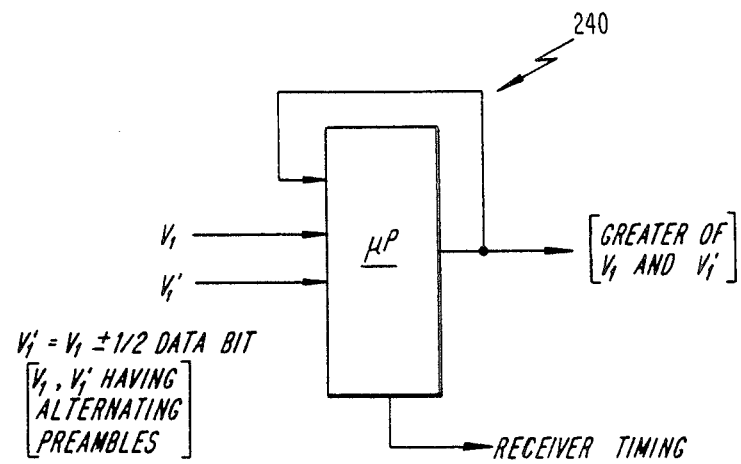
FIG. 21 is a diagram of a circuit for locking a transmitter and receiver to the same timing pulses.

A simplified circuit for synchronizing receiver timing to cause the receiver and transmitter to be locked to the same timing pulses as shown in FIG. 21. Microprocessor 240 develops a secondary channel V1' offset from channel V1 by one-half of a data bit. In response to an incoming sequence having an alternating preamble, the microprocessor 240 compares the magnitudes of te data outputs from the channel V1 and its half bit delayed channel V1', and identifies the one channel having the larger magnitude. This channel is thus presumed to be the one which is locked to the same timing pulses as the transmitter is, and is reapplied to the microprocessor for data recovery.

Figure 24A:
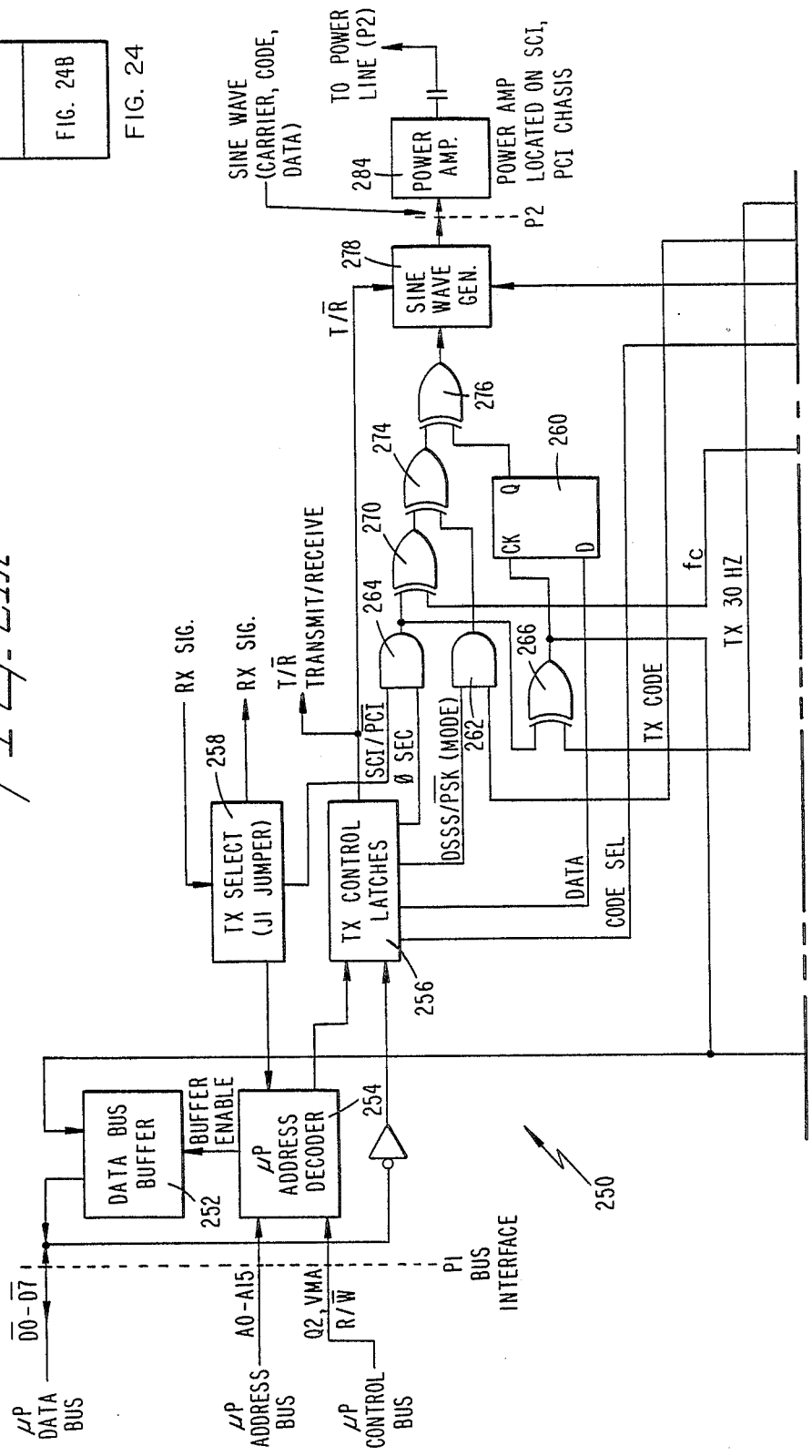

Hardware implementation of the transmitter incorporated within each PCI 102 and SCI 104 is shown in FIGS. 24a and 24b. The transmitter, designated as 250, provides the necessary signals and timing for spread spectrum and FSK modulation for injection onto the power lines. The transmitter further provides the timing necessary to synchronize the receiver 300, to be described in detail hereinafter, to transmissions.

The transmitter 250 is interfaced to the processor bus by buffer 252 and decoder 254. In response to an address on the bus identifying the particular PCI or SCI whose transmitter is to be enabled, address decoder 254 "opens" a bank of control latches 256 that store signals corresponding to data applied to the transmitter 250 by processor 240. The data stored in latches 256 identify whether the particular transmitter is configured to transmit spread spectrum or PSK signals, which of alternate 60 cycle timing pulses is the one to which the transmitter and receiver must be synchronized to enable data to be extracted from the receiver and what PN code is selected. Whether the transmitter 250 is configured as a PCI or SCI transmitter is determined by jumpers in 258.

A D-type flipflop 260 provides synchronization among data, code and carrier. Gate 262 responsive to latches 256 transmits code only if the transmitter is configured to operate in a spread spectrum mode. Gate 264 is responsive to the phase of the timing of the 60 Hz. timing source to provide a phase signal corresponding to the leading or trailing edges of signals synchronized to the power line zero cross-over points at 30 Hz., when the transmitter is in an SCI mode of operation. Gate 266, which is responsive to the output of gate 264 and is synchronized to D-type flipflop 268 (FIG. 24b), determines whether the positive or negative edge of the 30 Hz. timing source corresponds to the timing source of the receiver, to enable data to be extracted from the transmitted signal, as explained previously with respect to FIGS. 20a-20e.

The output of gate 264, together with the carrier signal fc obtained from timing latch 290, is applied to gate 270. The output of gate 270, which is the product of its inputs, i.e., the carrier fc synchronized to one of the proper alternate 60 Hz. zero crossover timing pulses of the power line, is applied to one input of gate 274. The output of gate 262 is applied to the other input of gate 274 wherein during a DSSS mode of operation the delayed code from code delay 272 is multiplied by the carrier fc. The product is applied to gate 276 for further multiplication by delayed data developed at the output of flipflop 260. The data stored in flipflop 260 are obtained from the microprocessor data bus via latches 256, synchronized to the correct one of alternate 60 Hz. timing pulses to enable the data to be obtained from the receiver, by gate 266.

The product of code, carrier and data is applied to sine wave generator 278, which is a conventional pseudo-digital-to-analog converter, turned on by the output of control latches 256 and fed by multiples of the carrier frequency developed by address counters 282 (FIG. 24b) to develop the sinusoid. The output of the sine wave generator 278 is amplified by a power amplifier 284 to be applied to the power lines.

The code delay circuit 272, which as aforementioned establishes a predetermined time delay corresponding to each transmitter, delays the standard PN code by an amount determined by the latches 256 over the code select-line CODE SEL. In the preferred embodiment, there are 7 code select lines to provide 128 possible code delays.

The standard code is stored in a read only memory 286 addressed by address counter 282 which counts down from a high frequency clock locked to the 60 Hz. power line by a phase-locked loop 288. The ROM 286 also generates the preselected carrier frequency and the 30 Hz. and 60 Hz. timing signals as well as spreading frequency $F_s$ (code clock frequency). The 60 Hz. signal generated by ROM 286 is fed back from timing latch 290 to phase-locked loop 288 to synchronize all internally generated signals to the power lines. The 30 Hz. signal from ROM 286 is the data period used to establish the synchronized data signal at flipflop 260.

Gates 294 are synchronized to phase-looked loop 288 and to shift register delay 268 to reset address counters 282 which establish the code delay of the transmitter, to the positive going edge of the 30 Hz. signal. 30 Hz. and 60 Hz. timing signals, as well as a 365.76 kilohertz synchronization signal, are transmitted to the receivers via gates 296.

Figure 25B:
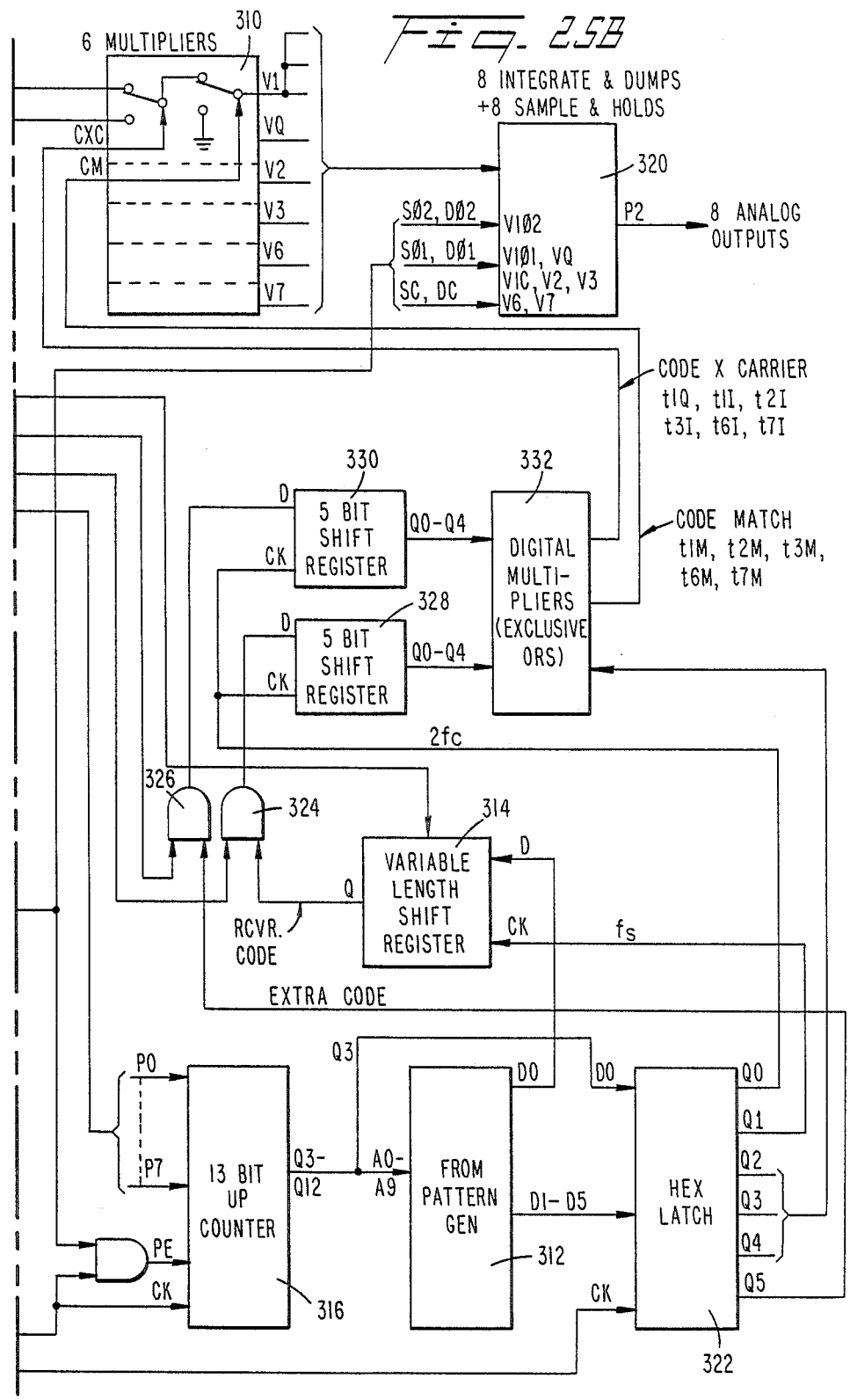

Referring now to FIGS. 25a and 25b, the implementation of the receiver 300 used in the PCIs 102 and SCIs 104 is set forth therein in detail. In FIG. 25a, the receiver includes an address decoder 302 which monitors the microprocessor bus address and in response to the predetermined address occurring on the address bus, enables receiver control latches 304 to store data received on the data section of the microprocessor bus. The control latches 304 establish in the receiver the particular code being received (CODE), the code delay to which the receiver is tuned (CODE SEL), and whether the receiver is responsive to spread spectrum or PSC signals (DSSS/PSK). Latches 304 also store the delay determined by microprocessor 240 that is required to maximize the signal to noise ratio (DYNAMIC DELAY), the COARSE RATE SELECT to select data rates of less than 30 Hz., and the PHASE SELECT which determines which of the two successive 60 Hz. pulses constituting each 30 bit data period is the one to which the transmitter is synchronized, to enable data to be extracted from the receiver.

An input selector 306 applies to a variable gain stage 308 either a ground signal or a filter output to be applied to a correlator circuit 310 for correlation with two locally generated signals, i.e., the replica of the incoming code having an assigned code shift and another replica of the same code having an unassigned code shift; these two codes are developed by read only memory 312 and shift register 314. The ROM 312 is addressed by up-counter 316 that counts clock pulses from input timing selector 318 and determines the time at which the ROM generates the code, and thereby determines the code shift.

Whereas the corresponding counter in the transmitter 250 is reset at a 30 Hz. rate to start the timing base for developing the time shift of the code, the counter 316 in receiver 300 is preset at P0-P7 with the dynamic delay developed by microprocessor 240 and stored in latches 304. The static delay stored in the receiver latches 304 is applied on lines $P_0-P_{11}$ to down-counter 320 having an output that controls the cycling of integrators 320 constituting a part, together with multipliers 310, of the correlation detectors, and establishes the static delay with which the dynamic delay of counter 316 is combined to establish receiver timing.

The code developed by pattern generator 312, together with receiver timing from counters 316 and 320 are applied to Hex latch 322 from which is developed the spread frequency $F_s$ applied to clock the variable length shift register 314 and thereby to develop the receiver code, shifted in accordance with the CODE SELECT stored in latches 304, corresponding to the code shift of the desired transmitter. The receiver code is clocked during DSSS operation also controlled by latches 304 through gate 324 to shift register 326. Correspondingly, the additional code, having an unassigned code shift is transferred from latch 322 to gate 326 to be applied, when the receiver is configured in a PCI 102, to shift register 330.

The outputs of the two shift registers 328 and 330 consist respectively of the shifted code, the unassigned shifted code and displacements of each at $\pm \frac{1}{3}$ and $\pm \frac{2}{3}$ of a code chip, to develop the five channels V1, V2, V3, V6 and V7, used for coarse synchronization. To shift the code by $+\frac{1}{3}$ a code shift, however, the carrier must be shifted by 180° (V2, V3). A 0° phase shift of the carrier is required for channels V1, V6 and V7 and a 90° phase shift is required for $V_g$, used in fine tuning. These carrier phase shifts are obtained from the latch 322 at Q2, Q3 and Q4.

The output of multiplier 332 thus consists of five code-carrier products corresponding to the preselected code shift and five code-carrier products corresponding to the unassigned code shift. In addition, there is a quadrature code shift corresponding to the peak correlation, whereby there are a total of 11 signals applied on the lines shown to multipliers 310.

The operation of multipliers 310 is described in detail with reference to FIG. 16, wherein, together with integrate and dump circuit 320, the following equation is satisfied:

$$V_N = {_0}\mathcal{C}^t S(t_N) [r(t_N) - e(t_N)] dt \qquad (1)$$

where $V_N$ is an analog output signal for each channel,
$S(t_N)$ is the analog input signal,
$r(t_N)$ and $e(t_N)$ are, respectively, binary signals corresponding to the reference code having the preselected time shift and the extra code having the unassigned code shift. This is the signal processing that takes place in the simplified schematic diagram of the receiver in FIG. 12.

Figure 16:
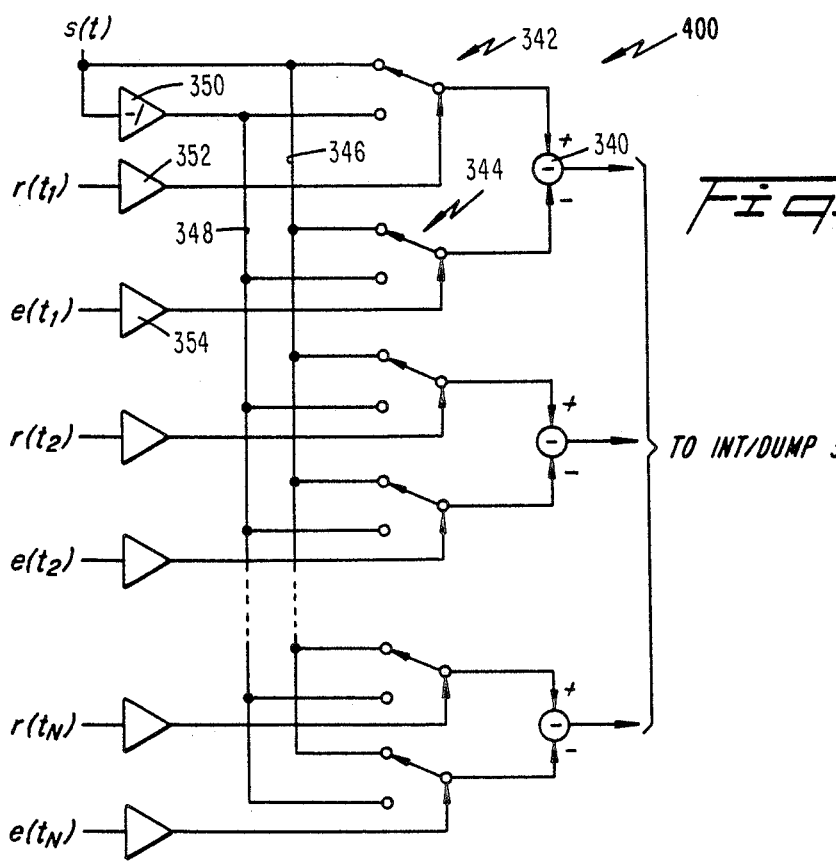
FIG. 16 is a circuit diagram of a multiple correlation detector for determining degree of correlation with an incoming digital signal, in accordance with the invention.

Only the polarities of the reference sequences r(t) and e(t) are used, whereby because the two reference sequences are binary (bi-polar) signals, multiplication can be achieved in an N channel correlator using 2N two-input analog multiplexers and one inverter, as shown in FIGS. 25b and 16. In this implementation, the binary reference signal determines whether the input signal S(t) or an inverted input signal $\bar{S}$)/ is selected to be applied to subtraction circuit 308. Bearing in mind that the desired output of each of the N difference circuits 308 is $S(t_N)[r(t_N) - e(t_N)]$, each channel in the multipliers 310 comprises a first two-input multiplexer 342 and a second two-input multiplexer 344 controlled, respectively, by the instantaneous polarities of the first and second bipolar reference sequences $r(t_N)$ and $e(t_N)$. One end of each of the multiplexers 342, 344 is connected to a first line 346 that receives the incoming sequences S(t) and a second input connected to a line 348. The line 348 receives the incoming sequences $\bar{S}$)/ inverted in polarity by an inverter 350. The multiplexers 342 and 344 are driven by the reference sequences $r(t_N)$ and $e(t_N)$ through drivers 352 and 354.

Assuming that the polarities of $r(t_N)$ and $e(t_N)$ are identical, both of the muliplexers 342 and 344 are connected to the line 346. The input sequence S(t) is thus applied to both the positive and negative input terminals of the difference circuit 340 whereby a 0 signal is applied to the integrate and dump circuit 320 (FIG. 25b). If $r(t_N)$ is positive and $e(t_N)$ is negative, multiplexer 342 is connected to line 346 and multiplexer 344 is connected to line 348. The sequence S(t) is thus applied to the positive input of difference circuit 308 and the inverted sequence S(t) is applied to the negative input terminal of circuit 308; the sequence 2s(t) is thereby applied to integrate and dump circuit 320. If, on the other hand, the relative polarities of the two reference sequences are reversed, the sequence S(t) is applied to the negative input of difference circuit 340 and the inverted sequence S(t) is applied to the positive input of difference circuit 340. The signal −2s(t) is thus applied to integrate and dump circuit 320, thereby satisfying equation (1).

The output of the integrate and dump, sample and hold circuit 320 is applied to analog to digital converters to be converted into digital signals applied to the microprocessor 250.

Signals processed by the receiver are shown in FIG. 26 and are referenced to the circuit diagram shown in FIGS. 24a, b and 25a, b.

Figure 27:
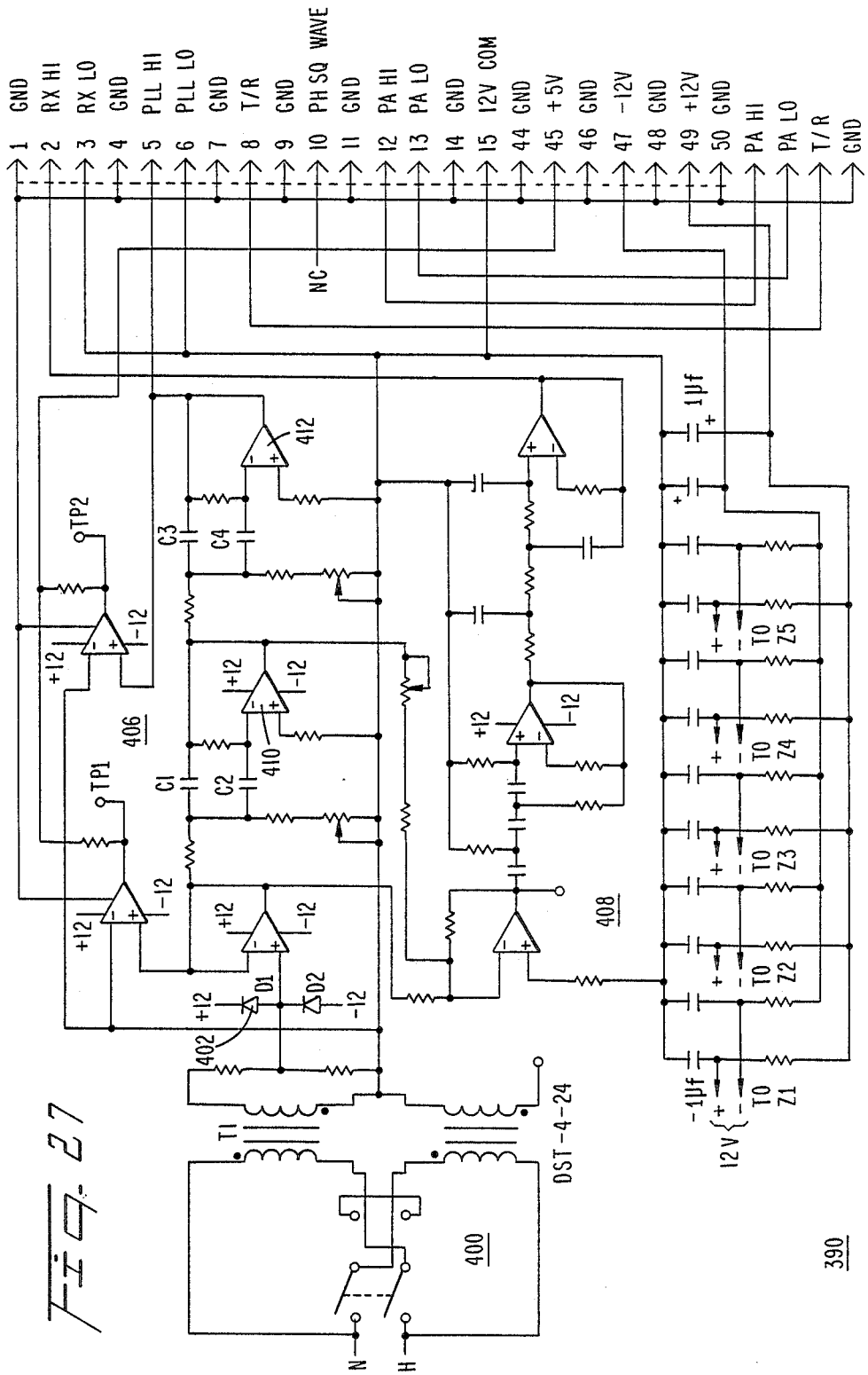
FIG. 27 is a circuit diagram of a filter used within the DEM system.

FIG. 27 is a circuit diagram of a power line filter 390, in each of the PCIs 102 and SCIs 104, establishes a pass band for despread communication data on the power lines as well as obtains 60 Hz. zero crossover pulses from the power lines for system timing. The line voltage monitored by line transformer 400 is applied through surge protection diodes 402, 404 to a narrow band pass filter 406 at 60 Hz. to provide a noise free reference for phase locked loop 288 and a wide band pass filter 408 for the received signals. The signals applied to phase locked loop are adjusted in frequency by amplifiers 410, 412 in filter 406.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. In a load management and electrical energy distribution system having a system operations center (SOC) and a plurality of load terminals, a distribution network for establishing bidirectional data communications between the SOC and said load terminals, comprising:

primary communications interface units (PCIs) on a high voltage portion of said distribution system, each having a first programmed computer in communication with said SOC over a first bidirectional communications network; and secondary communications interface units (SCIs) on a low voltage portion of said distribution system, each having a second programmed computer in communication with one of said (PCIs) over a second bidirectional communications network including electrical utility primary distribution power lines;

said load terminals on said low voltage portion of said distribution system and in communication with said SCIs over a third bidirectional communications network.

2. The system of claim 1, wherein said first bidirectional communications network includes telephone lines.

3. The system of claim 1, wherein said third bidirectional communications network includes end user electrical wiring.

4. The system of claim 1, wherein said second bidirectional communications network includes at least one distribution transformer, at least one of said SCIs being located at a low voltage side of said transformer.

5. The system of claim 1, including signal multiplexing means in said second bidirectional communications network for establishing simultaneous communications between said PCIs and SCIs.

6. The system of claim 1, wherein communication in said second communications network is established by code division multiplexing.

7. The system of claim 6, wherein said multiplexing includes direct sequence spread spectrum (DSSS) signal processing.

8. The system of claim 1, wherein communication in said third communications network is established by phase shift keyed modulation.

9. The system of claim 1, wherein said SCIs include means for polling said load terminals including transmitting to said load terminals data requests and receiving therefrom load status data.

10. In a load management and electrical energy distribution system having a system operations center (SOC) and a plurality of load terminals, a distribution network for establishing bidirectional data communications between the SOC and the load termnals, comprising:

primary communications interface units (PCIs) on a high voltage portion of said distribution system, each having a first programmed computer in communication with said SOC over a first bidirectional communications network;

secondary communications interface units (SCIs) on a low voltage portion of said distribution system, each having a second programmed computer in communication with one of said PCIs over a second bidirectional communications network; and each of said PCIs including signal multiplexing receiver means for receiving data transmitted simultaneously by at least two SCIs of said second group over said second communications network;

said load terminals on said low voltage portion of said distribution network and in communication with said SCIs over a third bidirectional communications network.

* * * * *